(12) United States Patent
Taki et al.

(10) Patent No.: US 6,829,117 B2
(45) Date of Patent: Dec. 7, 2004

(54) DATA LIBRARY THAT READS A MEMORY WHILE TRANSPORTING THE RECORDING MEDIUM

(75) Inventors: Yoshitsugu Taki, Kanagawa (JP); Masahiro Kodama, Kanagawa (JP); Toshiya Kurokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 254 days.

(21) Appl. No.: 10/178,450

(22) Filed: Jun. 24, 2002

(65) Prior Publication Data

US 2003/0039051 A1 Feb. 27, 2003

(30) Foreign Application Priority Data

Jun. 26, 2001 (JP) ................................. P2001-193775

(51) Int. Cl.$^7$ .............................................. G11B 15/68
(52) U.S. Cl. ......................................... 360/69; 360/92
(58) Field of Search ............................ 360/69, 71, 85, 360/92, 96.5, 98.05, 99.07; 369/30.29, 30.3, 30.31, 30.32, 30.33, 30.34, 30.35, 30.36, 33.01, 34.01; 414/270, 273, 274, 279, 280, 281, 331.05

(56) References Cited

U.S. PATENT DOCUMENTS

| | | | | |
|---|---|---|---|---|
| 5,971,281 A | * | 10/1999 | Frary et al. | 235/487 |
| 6,201,474 B1 | * | 3/2001 | Brady et al. | 340/572.8 |
| 6,663,003 B2 | * | 12/2003 | Johnson et al. | 235/385 |
| 6,667,846 B2 | * | 12/2003 | Kano et al. | 360/96.5 |
| 6,674,596 B1 | * | 1/2004 | Takayama | 360/69 |

* cited by examiner

*Primary Examiner*—David Hudspeth
*Assistant Examiner*—James L Habermehl
(74) *Attorney, Agent, or Firm*—Jay H. Maioli

(57) ABSTRACT

An antenna is provided for use with a memory (MIC) incorporated in a recording medium that stores management data. The antenna is located at a position to read data signals from the memory before the recording medium inserted through an insertion port is completely transported to the transport mechanism of a drive. Thus, a recording/playback apparatus and a data library can be provided, which can use a large amount of information to manage the recording medium as management data before the recording medium is inserted into the drive.

8 Claims, 22 Drawing Sheets

DATA LIBRARY THAT READS A MEMORY WHILE TRANSPORTING THE RECORDING MEDIUM

BACKGROUND OF THE INVENTION

1. Field of the Invention

This invention relates to a recording/playback apparatus that can hold a plurality of recording medium and can record and play back data signals on and from the recording medium. The invention also relates to a data library.

2. Description of the Related Art

Hitherto, to process a large amount of data in various ways in a computer system, it is necessary to back up the data stored in the server. Generally, the data is backed up on optical discs such as compact discs (CD: registered trademark) or on magneto-optical discs. If the data is too large to be recorded on an optical discs, it may be recorded on a tape cassettes for so-called "8-mm video" (registered trademark). One tape cassette can store about 50 GB (gigabytes) to 100 GB of data.

However, much time is required to make access to the desired data recorded in a tape cassette. Therefore, only the data used frequently is recorded on an optical disc, whereas all data including the data used not so often is recorded in a tape cassette.

A recording/playback apparatus called "data library" has been proposed as a recording/playback apparatus that is useful for backing up such data. The data library comprises a plurality of tape cassettes, any one of which may be selected so that data signals may be recorded in it or played back from it.

This recording/playback apparatus comprises a cassette storage section, a recording/playback section, and a transport section. The cassette storage section can hold a plurality of tape cassettes. The recording/playback section is designed to record data in the tape cassettes and play back data therefrom. The transport section transports tape cassettes between the cassette storage section and the recording/playback section.

In a recording/playback apparatus of this type, the recording medium is identified and managed in accordance with the codes, e.g., barcodes (registered trademark), labeled on the recording medium. That is, the codes on the medium is optically read and the medium is identified and managed on the basis of the information thus read.

Optical readers for reading codes, known as "barcode readers," can hardly be made small. Their manufacturing cost is high. Further, the amount of information that one barcode can represent cannot be so large.

BRIEF SUMMARY OF THE INVENTION

Accordingly, an object of the present invention is to provide a recording/playback apparatus that can use a large amount of information to manage recording medium and is simple in structure. Another object of the invention is to provide a data library in which a large amount of information recording medium can be used and managed.

To achieve the above-mentioned object, a recording/playback apparatus comprises: a housing; a storage mechanism having a rotary member and a plurality of storage sections and arranged in front of the housing, for storing a plurality of recording medium, said rotary member being able to rotate around a vertical axis and in a horizontal plane, and said storage sections being arranged around the rotary member, for storing a plurality of recording medium; an insertion port made in a front panel of the housing, for allowing a recording medium to be inserted and removed, at the front of the housing, into and from any one of the storage sections that is located at near the front of the housing; a recording/playback section for recording and reproducing data on and from the recording medium; a transport mechanism arranged at the back of the storage mechanism, for transporting the recording medium between any one of the recording/playback section and any one of the storage sections that is located at the back of the housing; a control circuit section connected to the storage mechanism, the recording/playback section and the transport mechanism, for controlling the storage mechanism, the recording/playback section and the transport mechanism; and transmitting/receiving means for transmitting and receiving data signals to and from a memory means provided in any one of the recording medium and storing management data, without contacting the memory means and by way of an antenna, and for transmitting the data obtained from the recording medium to the control circuit section.

The antenna is located near the storage mechanism and at a specific position. So located, the antenna can transmit and receive data signals to and from the memory means provided in any recording medium, before the recording medium inserted into a storage section of the storage mechanism through the insertion port is completely transported to the transport mechanism as the rotary member of the storage mechanism is rotated.

As described above, in the recording/playback apparatus according to this invention, antenna is located near the storage mechanism and at such a position as to transmit and receive data signals to and from the memory means provided in any recording medium, before the recording medium inserted into a storage section of the storage mechanism through the insertion port is completely transported to the transport mechanism as the rotary member of the storage mechanism is rotated.

Hence, in the recording/playback apparatus to this invention, when the storage mechanism finishes transporting a storage medium to the transport mechanism, the management data has already been read from the memory means of the recording medium.

The present invention can therefore provide a recording/playback apparatus and a data library, which can use a large amount of information to manage recording medium as management data before the recording medium is inserted into the drive and which is simple in structure.

DETAILED DESCRIPTION OF THE INVENTION

An embodiment of the present invention will be described, with reference to the accompanying drawings.

The embodiment is a recording/playback apparatus that uses tape cassettes as recording medium. The tape cassettes are so-called "8-mm video" (registered trademark). One tape cassette can store about 50 GB (gigabytes) to 100 GB of data.

The recording/playback apparatus according to the invention will be described, referring to the following items in the order mentioned.

[1] Overall configuration of the apparatus
[2] Basic unit of the apparatus
[a] Housing
[b] Drive (recording/playback section)
[c] Cassette shelf (cassette storage section)
[d] Transport mechanism
[Lift table]
[Slide table]
[Transfer table]
[Clamp unit]
[e] MIC transmitting/receiving antenna
[f] MIC data configuration
[g] Replacing of the drive
[3] Expansion units
[4] Coupling of the basic unit and the expansion units
[5] Operation
[a] Insertion and removal of tape cassettes into and from the cassette shelf
[b] Removal of tape cassettes from the cassette shelf
[c] Transport of tape cassettes to the drive
[d] Returning of tape cassettes from the drive to the tape cassette shelf These items will be described in the order mentioned.

[1] Overall Configuration of the Apparatus

Figure 1:
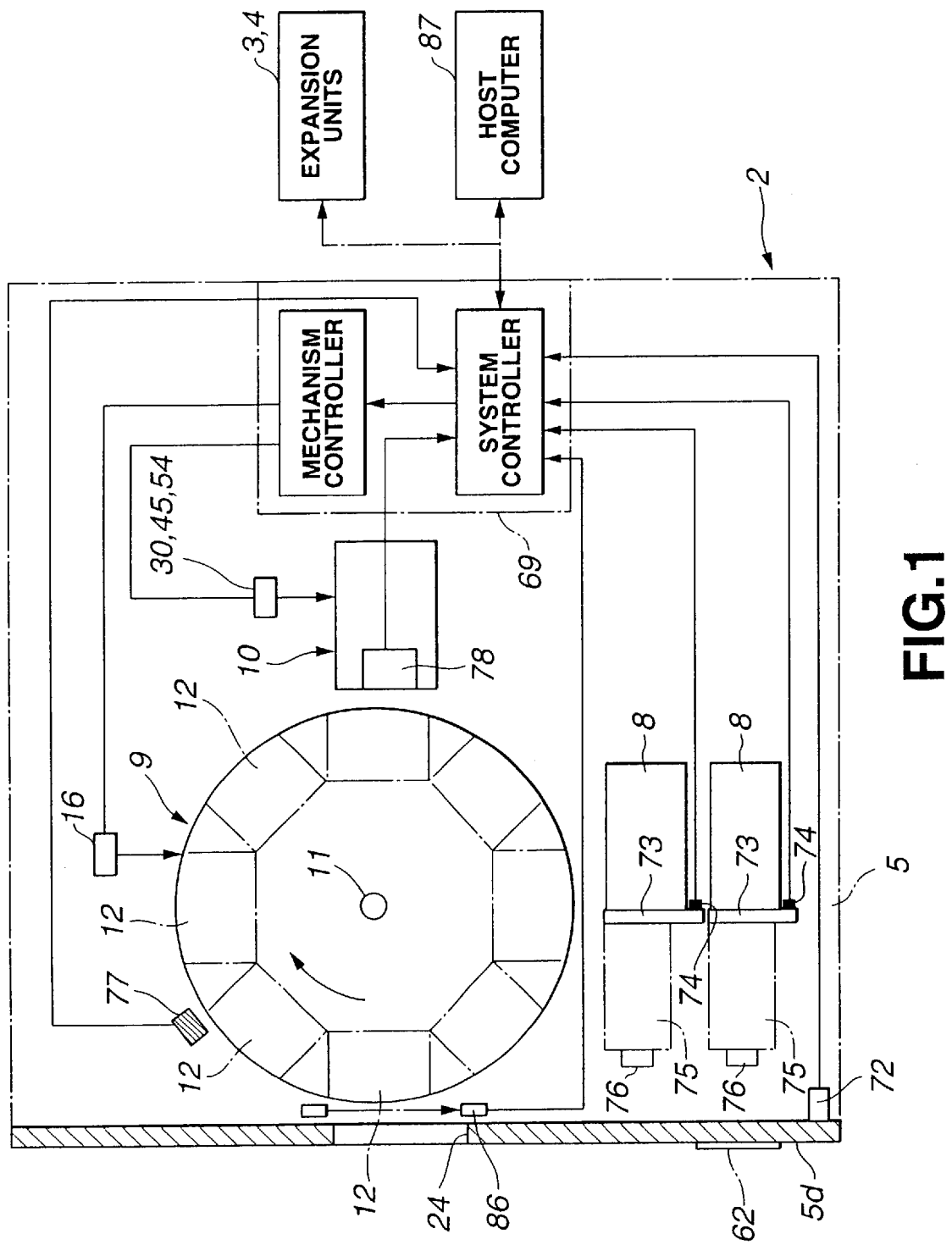
FIG. 1 is a block diagram of the basic unit of a recording/playback apparatus according to the present invention.
Figure 2:
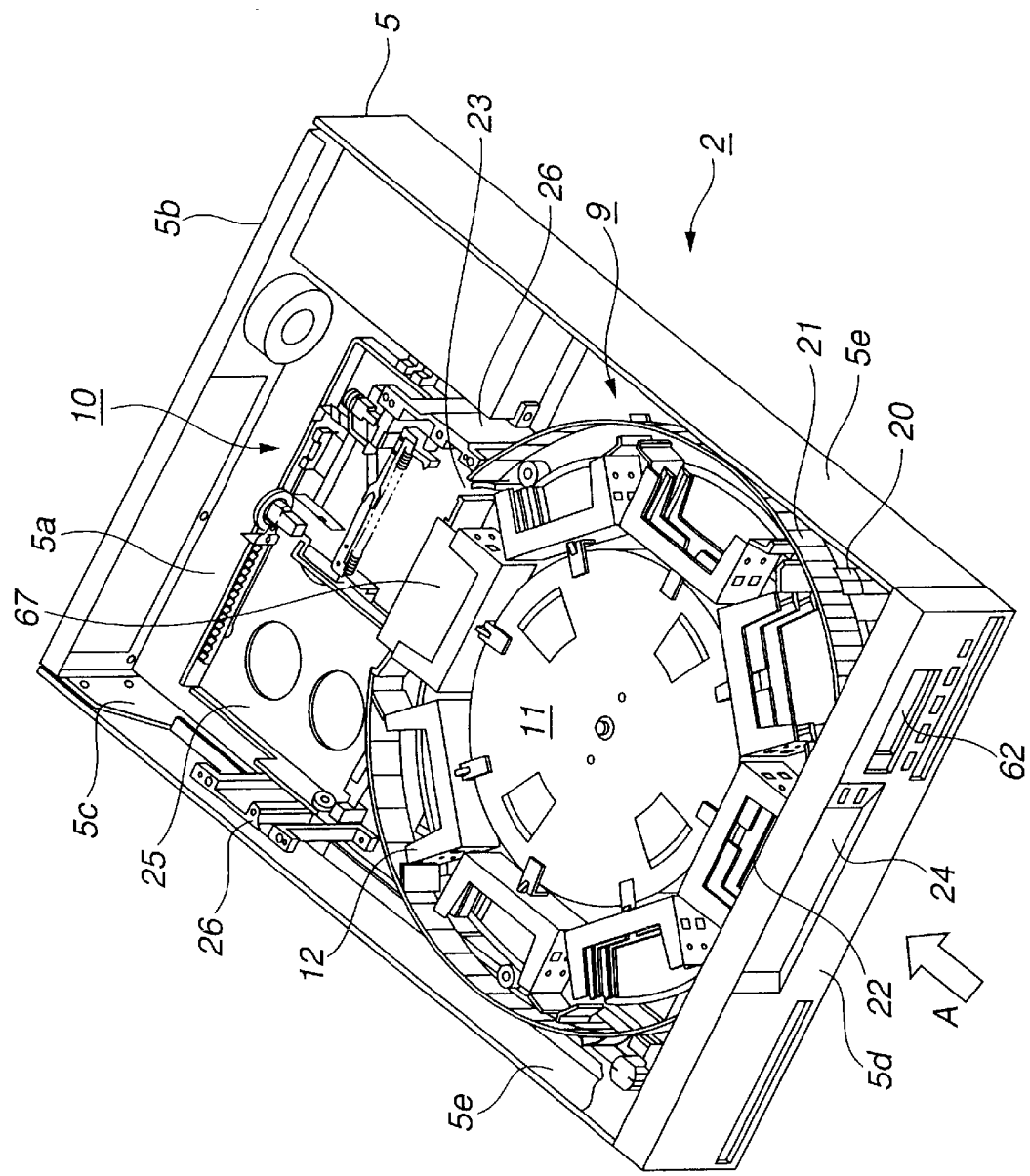
FIG. 2 is a perspective view of the basic unit of the recording/playback apparatus shown in FIG. 1.

A recording/playback apparatus according to this invention has a basic unit. As FIGS. 1 and 2 show, the basic unit comprises a housing 5, a cassette shelf 9, one or more drives 8, and a transport mechanism 10. The cassette shelf 9 is a cassette storage section for holding a plurality of tape cassettes. The drive 8 is a recording/playback section for recording and reproducing data on and from any tape cassette. The transport mechanism 10 transports tape cassettes between the cassette shelf 9 and the drive 8. The cassette shelf 9, drive 8 and transport mechanism 10 are incorporated in the housing 5. In the housing 5, the cassette shelf 9, drive 8 and transport mechanism 10 are connected. The housing 5 incorporates a control circuit section 69. The control circuit section 69 comprises a system controller and a mechanism controller. The mechanism controller controls the motor 16 (described later) provided in the cassette shelf 9 and the motors 30, 45 and 54 (later described) provided in the transport mechanism 10. The system controller controls a connector 74, which in turn controls the drive 8. MIC antennas 77, a barcode reader 78 and a cassette-in detecting sensor 86, all to be described later, are connected to the system controller. The system controller receives signals from the antenna 77, barcode reader 78 and sensor 86. The cassette-in detecting sensor 86 is designed to detect a tape cassette optically when the cassette is inserted into the cassette shelf 9 through a slot 24 positioned in the front panel 5d of the housing 5.

A LCD display device 62 is provided only the front panel 5d of the housing 5. A connector 72 connects the LCD display device 62 to the system controller. The system controller controls the operation of the LCD display device 62.

The system controller is connected to the control circuit sections provided respectively in expansion units 3 and 4

(described later) and to a host computer 87 provided outside the recording/playback apparatus. The system controller can therefore receive and supply data signals from and to the host computer 87.

Figure 17:
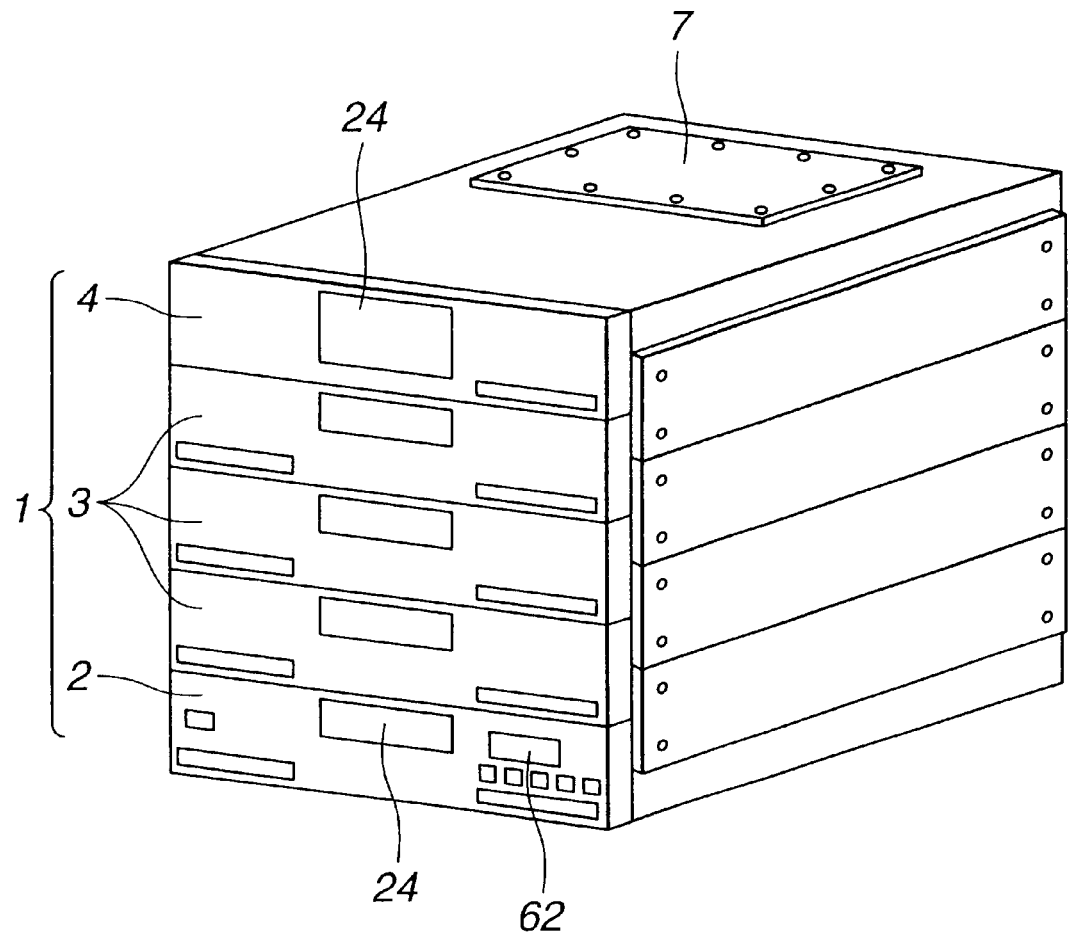
FIG. 17 is a perspective view of an assembly according to the invention, composed of a basic unit and four expansion units coupled together.

As FIG. 2 shows, the housing 5 incorporates a pair of rack pillars 26. The rack pillars 26 serve as the first guide members that guide the transport mechanism 10. The recording/playback apparatus may have only the basic unit 2. Nonetheless, it may have two or more expansion units 3 and 4 atop the basic unit 2 as is illustrated in FIG. 17, by connecting additional rack pillars that serve as second guide members. The recording/playback apparatus may comprise the basic unit 2 located at the lowest stage and the expansion units 3 and 4 coupled to the basic unit 2 and located at higher stages.

Figure 18:
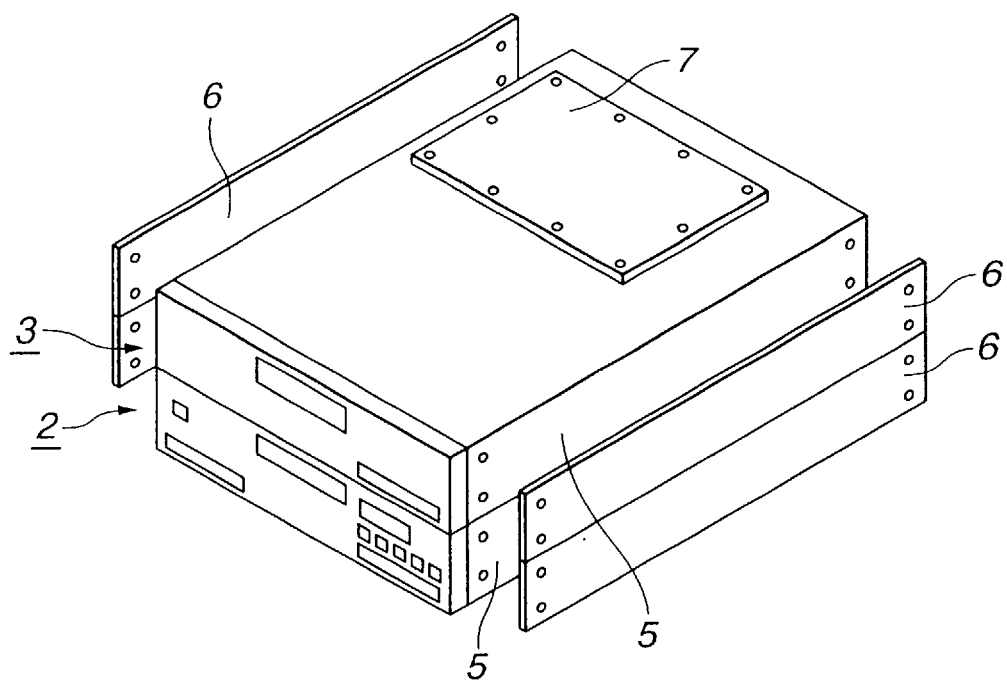
FIG. 18 is a perspective view of the basic unit of FIG. 1, showing one expansion unit not coupled to the basic unit yet.

To couple the expansion unit 3 to the basic unit 2, the housing 5 of the basic unit 2 is coupled to the housing 5 of the expansion unit 3, as is illustrated in FIG. 18. The housings 5 of the units 2 and 3 contain the components of the unit 2 and those of the unit 3, respectively.

Figure 19:
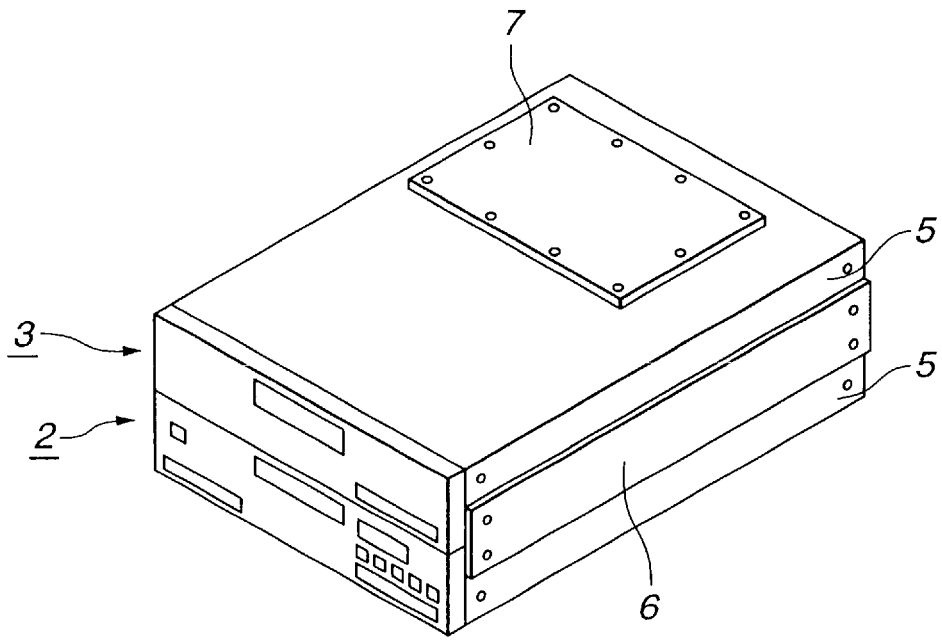
FIG. 19 is a perspective view of the basic unit of FIG. 1, showing one expansion unit coupled to the basic unit.

How the units 2 and 3 are coupled together will be explained. First, the coupling plates 6 are removed from both sides of the housing 5 of each of the units 2 and 3 by removing four screws. Then, the connection plates 6 are positioned, bridging the housings 5 of the units 2 and 3 as shown in FIG. 19. The four screws are driven, fastening one connection plate 6 to one side of the units 2 and 3, while the other four screw are driven, fastening the other connection plate 6 to other side of the units 2 and 3. The second, third and fourth expansion units may be connected likewise. Then, a recording/playback apparatus will be obtained, which comprises the basic unit 2 and three expansion unit 3 and one expansion unit 4 as shown in FIG. 17.

Through holes are made in the upper and lower walls of the housing 5 of the basic unit 2. Similarly, through holes are made in the upper and lower walls of the housings of the expansion units 3 and 4. These holes are vertically aligned with one another. Covers 7 close the through holes before the housings 5 are coupled together. At the time of coupling the housings 5 together, the covers 7 are removed from the upper wall of the housing 5 of the basic unit 2, from the lower wall of the housing 5 of the uppermost expansion unit 4 and from the upper and lower walls of the housing 5 of the other expansion units 4. Now that the through holes have been opened by removing the covers 7, the housings 5 communicate with one another, providing a space. In this space, the transport mechanism 10, which will be described later in detail, can move from one unit to another.

[2] Basic Unit

Figure 3:
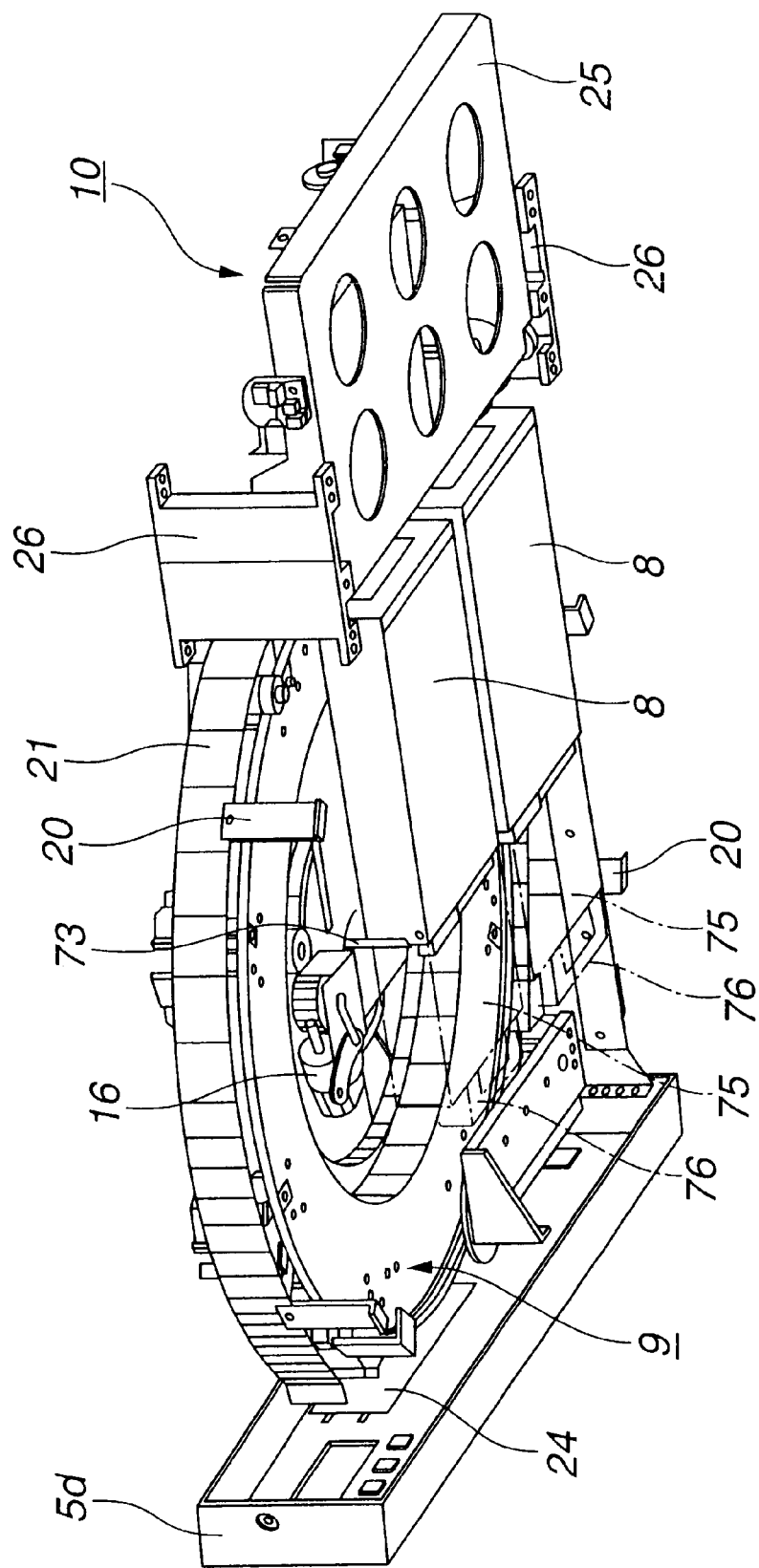
FIG. 3 is a perspective view of the basic unit of the recording/playback apparatus shown in FIG. 1, as viewed obliquely from below.

As FIGS. 1, 2 and 3 shows, the basic unit 2 comprises two drives 8, a cassette shelf 9, and a transport mechanism 10. The drives 8, cassette shelf 9 and transport mechanism 10 are provided in the housing 5. The drives 8 serve as recording/playback section that records and reproduce data on or from a tape cassette used as a recording medium. The cassette shelf 9 is a cassette storage section for holding tape cassettes. The transport mechanism 10 is designed to move a tape cassette between the cassette shelf 9 and either drive 8.

[a] Housing

Figure 16:
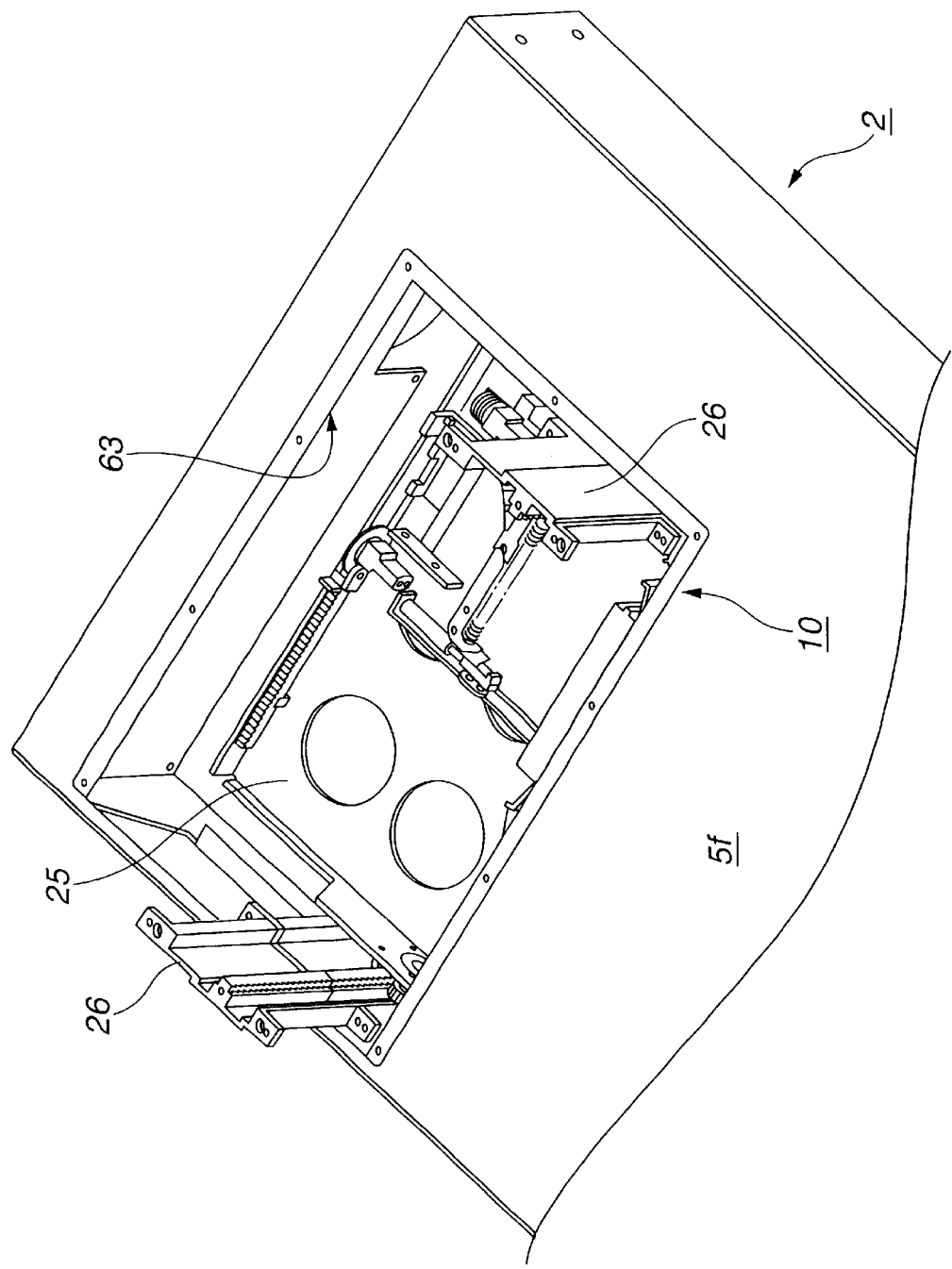
FIG. 16 is a perspective view of the basic unit of the recording/playback apparatus of the invention, depicting the top plate mounted on the rack pillars.

As FIG. 2 shows, the housing 5 comprises a bottom plate 5a, a back plate 5b, two side plates 5c, a front panel 5d, two auxiliary plates 5e, and a top plate 5f shown in FIG. 16. The bottom plate 5a, a back plate 5b and side plates 5c are formed integral. The front panel 5d covers the front of the housing 5. The auxiliary plates 5e covers the openings made in the side plates 5c. The housing 5 is 19 inches wide (about 48.26 cm) and 2 U high (1 U is about 44.45 mm; hence, 2 U is about 88.9 mm).

Figure 5:
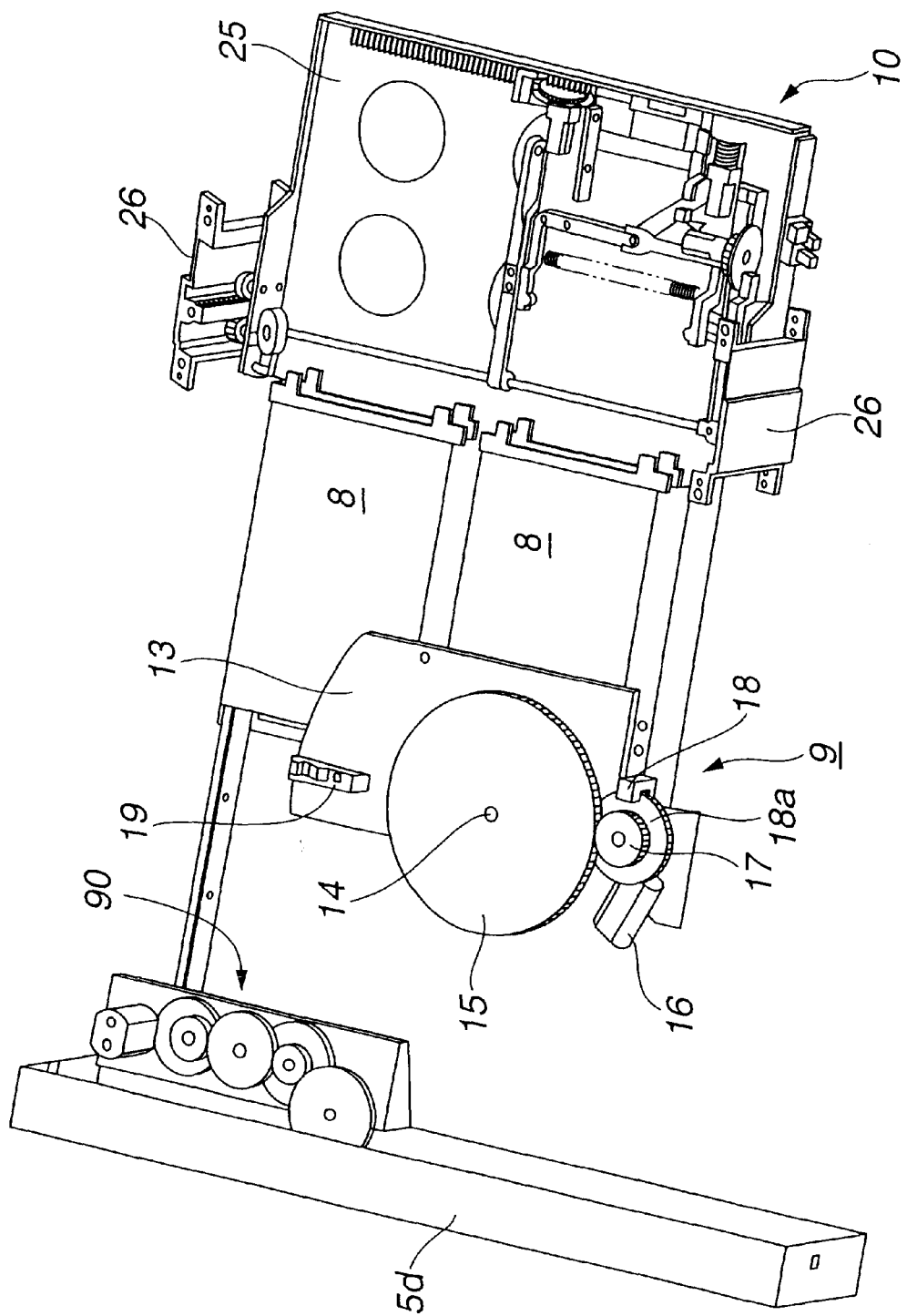
FIG. 5 is a perspective view of the basic unit of the recording/playback apparatus shown in FIG. 1, with the table (i.e., a component of the cassette shelf) removed.

The front panel 5d of the housing 5 has an inlet opening 24. Through the inlet opening 24, any one of the tape cassettes located in a front case 12 that is one of the cassette storage sections of the cassette shelf 9 can be inserted into and removed from the housing 5. The inlet opening 24 is enabled to open and close by a shutter (not shown) slidably positioned on the front panel 5d. As FIG. 5 shows, the shutter opens and closes the inlet opening 24 when it is driven by a combination of gears 90, which in turn are driven by a motor provided on the back of the front panel 5d. An LCD (Liquid Crystal Display) section 62 is provided on the front panel 5d.

Figure 6:
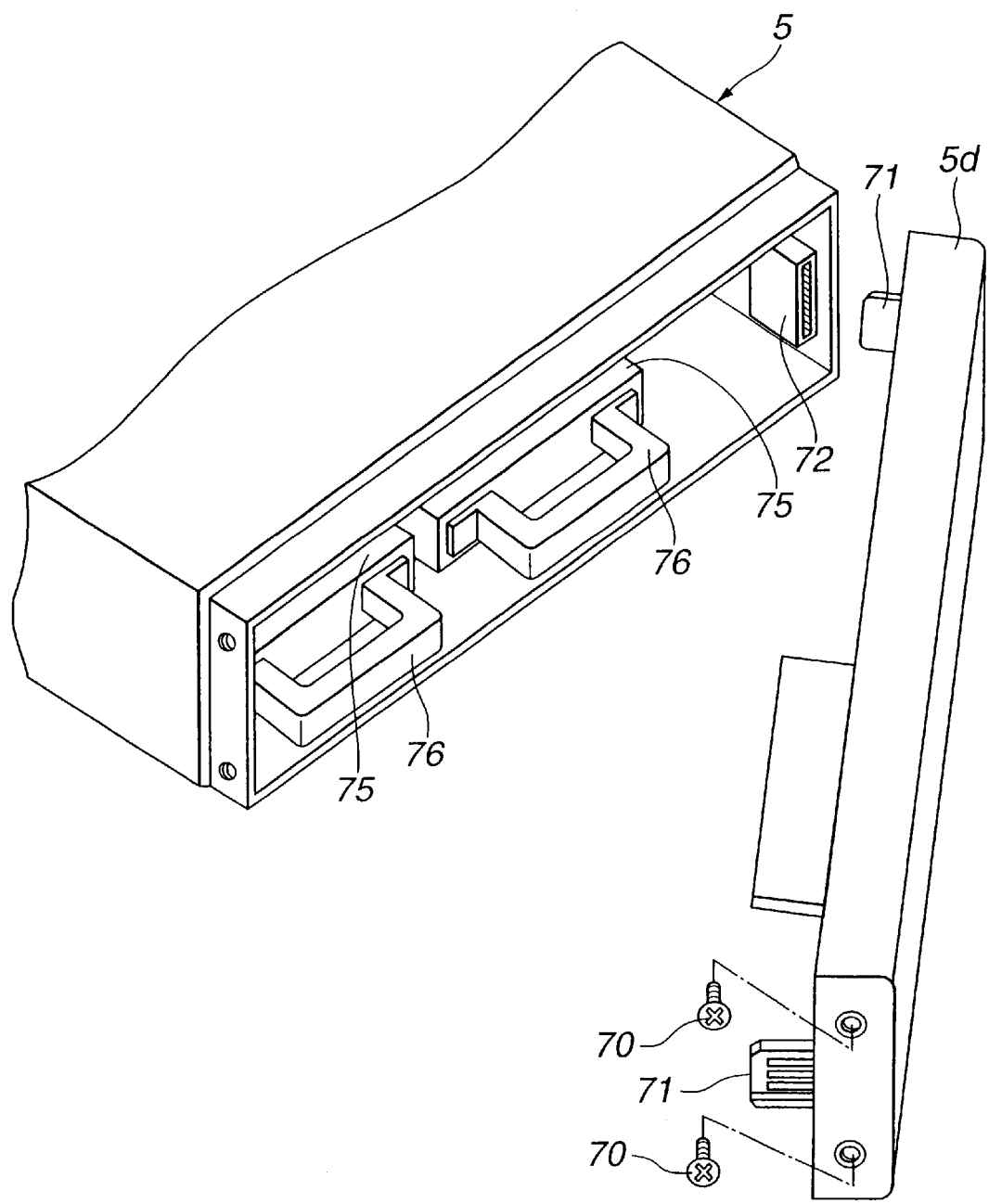
FIG. 6 is a perspective view showing the basic unit, with the front panel removed.

As FIG. 6 shows, the front panel 5d is removably secured to the housing 5. The front panel 5d can be easily removed, merely by removing screws 70. The motor for driving the shutter and the LCD section 62 are connected to a control circuit section (computer) 69 provided in the housing 5, by means of a terminal 71 and a connector 72. The terminal 71 protrude from one side of the front panel 5d. The connector 72 is contained in the housing 5. At the connector 72, the motor and the LCD display 62 can be disconnected from the control circuit section 69. The terminal 71 has a plurality of pins. Of these pins, the ground pin is longer than any other pin. Hence, the ground pin is the last to be removed from the connector 72 when the terminal 71 is disconnected from the connector 72. The ground pin is the first to be inserted into the connector 72 when the terminal 71 is connected to the connector 72.

[b] Drives (Recording/playback Section)

As FIGS. 2, 3, 5 and 10 show, the drives 8 are disposed at the intermediate part of the bottom plate 5a of the housing 5. In other words, the drives 8 lie below the cassette shelf 9 (later described in detail) within the housing 5. The drives 8 are configured to record and reproduce on and from tape cassettes.

Figure 7:
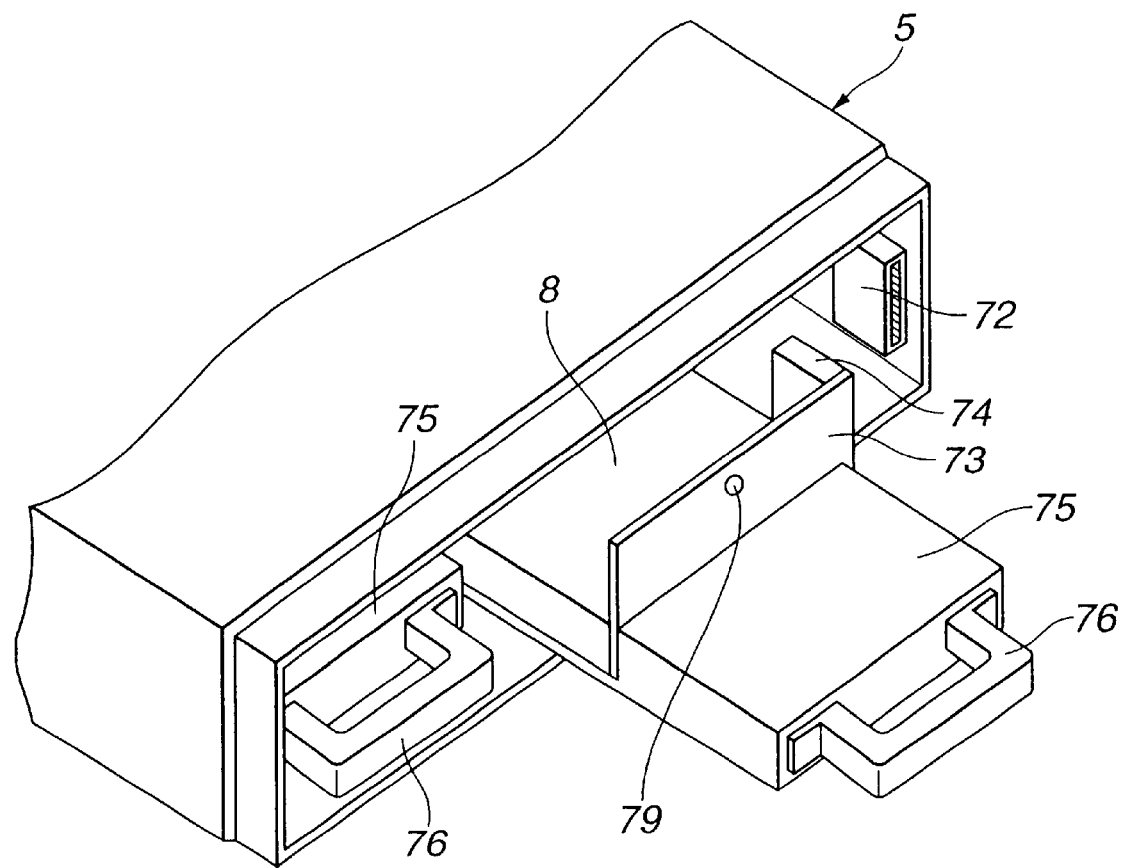
FIG. 7 is a perspective view of the basic unit, with the drive drawn forwards.

As seen from FIGS. 1 and 7, the drives 8 are connected to the control circuit section 69 through a connection board 73 and the connector 74. As FIG. 3 shows, the drives 8 have their front for insertion and removal of tape cassettes opposing the rear of the housing 5. Their connecting sections that are to be connected to external apparatuses oppose the front of the housing 5. As shown in FIG. 7, the connection board 73 is connected to the connecting sections of the drives 8. The connector 74 is located on one side of the drives 8 and attached to the connection board 73. The connector 74 can be attached and removed from the board 73 by moving the drives 8 back and forth.

Figure 8:
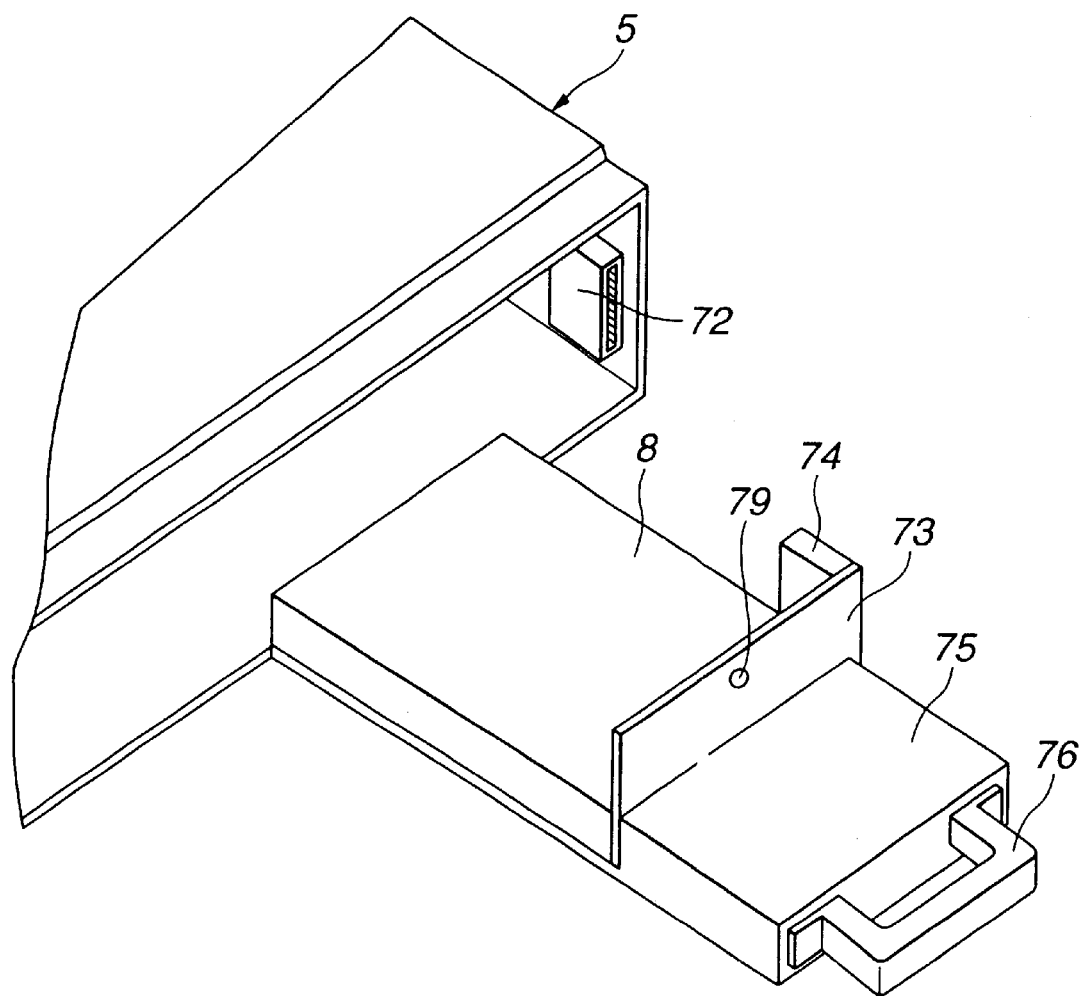
FIG. 8 is a perspective view of the basic unit, with the drive drawn more forwards.

Each drive 8 has an extension 75 and a handle 76, both extending forwards. Each drive 8 can be drawn from the front of the housing 5 along with the extension 75 when the handle 76 is pulled forwards as is illustrated in FIGS. 7 and 8.

[c] Cassette Shelf (Storage Mechanism)

As FIGS. 2 to 4 and FIG. 10 show, the cassette shelf 9 comprises a table 11 and a plurality of cases 12. The table 11 serves as a rotatable member and can rotate around a vertical axis in a horizontal plane. The cases 12 are mounted on the table 11 and arranged in circle along the circumference of the table 11. The cassette shelf 9 is provided within the housing 5, positioned near the front thereof and located above the drives 8. The cases 12 can hold a tape cassette each. Hence, the cassette shelf 9 can hold a plurality of tape cassettes.

Figure 4:
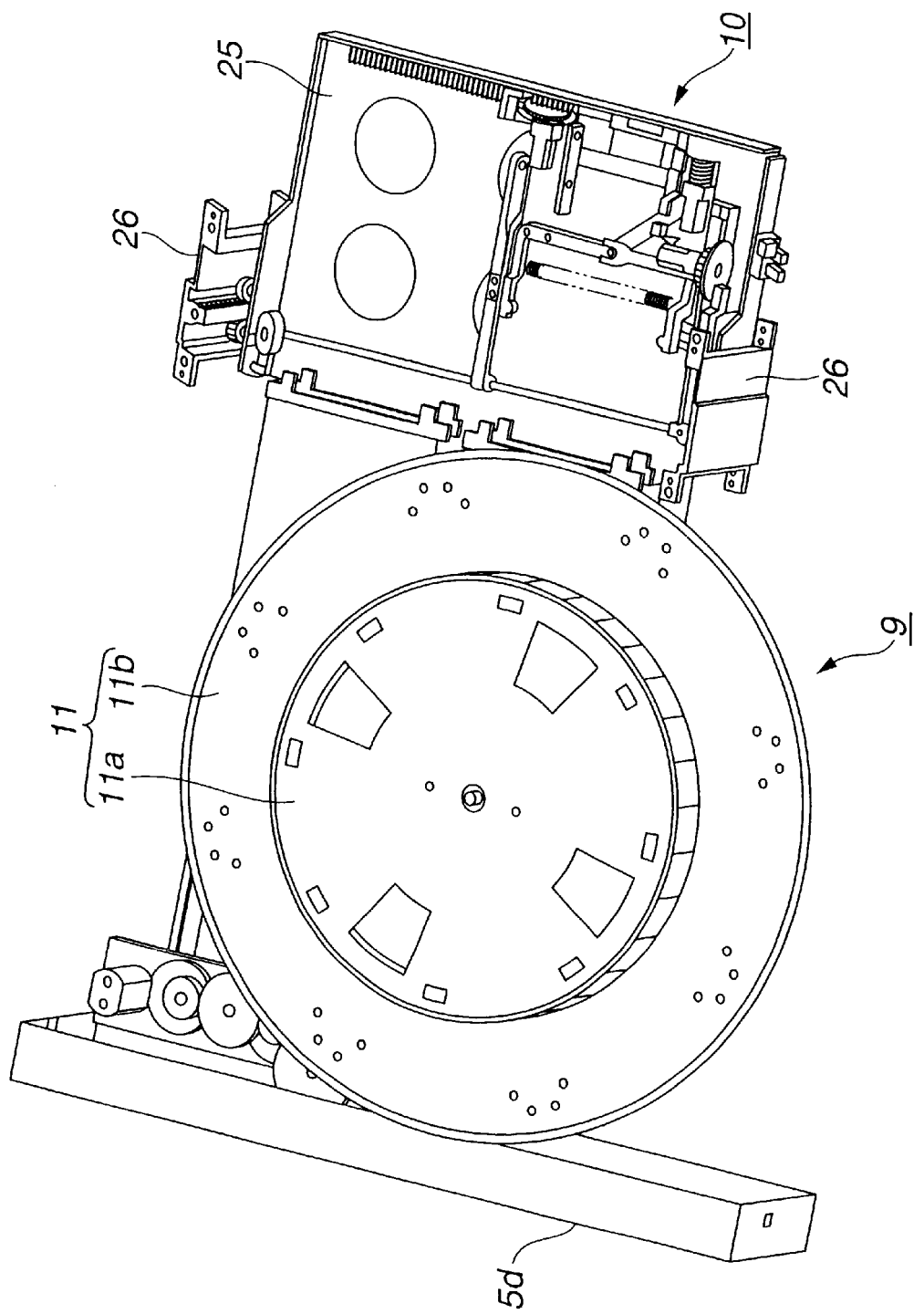
FIG. 4 is a perspective view of the table that is a component of the cassette shelf, i.e., a part of the basic unit of the recording/playback apparatus shown in FIG. 1.

As shown in FIG. 4, the table 11 comprises a circular support 11a and a case support 11b. The case support 11b is shaped like a ring and located at a lower level than the circular support 11*a*. As FIG. 2 depicts, the cases 12 for holding tape cassettes 67 are arranged on the case support 11*b*. In this embodiment, eight sets of cases 12 are arranged in a circle, at equal angular intervals. Each set consists of two cases 12 laid one upon the other and formed integral with each other. Each case 12 opens at the side located at the circumference of the table 11. A tape cassette 67 can be inserted into and removed from each case 12 at the open side thereof.

As illustrated in FIGS. 3 and 5, the table 11 is supported on a vertical axle 14 (drive shaft) and can rotate. A fastening plate 13 fastens the lower end of the axle 14 to the upper surface of the bottom plate 5*a* of the housing 5. A center gear 15 having larger external dimensions is mounted on the axle 14 and can freely rotate. The center gear 15 is fastened at its upper surface to the lower surface of the circular support 11*a* of the table 11. An electric motor 16 is secured to the bottom plate 5*a* of the housing 5. The shaft of the motor 16 is coupled to a gear 17 that is in mesh with the center gear 15. When the motor 16 is driven, it rotates the gear 17, which in turn rotates the center gear 15. As a result, the table 11 is rotated.

To stop the table 11 rotating at a predetermined position, a rotary plate 18*a*, an encoder 18 and a position sensor 19 are provided. The rotary plate 18*a* is formed integral with the gear 17. As FIG. 2 shows, a pair of fences 21 are mounted on the bottom plate 5*a* of the housing 5 to prevent a tape cassette from dropping from within a case 12 on the rotating table 11 by a centrifugal force. To be more specific, fences 21 are secured to the bottom plate 5*a* by mounting metal members 20, covering the circumference of the table 11. A narrow gap is provided between the fences 21 and the tape cassettes held in the cases 12. As FIG. 2 shows, the fences 21 are designed not to exist on the front or back of the cassette shelf 9, defining an outer gate 22 and an inner gate 23. The fences 21 therefore allow a tape cassette inserted into any case 12 by manual operation from the front of the housing 5 to be transported from the back of the cassette shelf 9 and to be loaded into the drive 8 by means of the transport mechanism 10. The tape cassette can be inserted into and removed from any case 12 of any set, though the opening 24, no matter whether case 12 is located on or beneath the other case of the set. Note that the LCD display 62 is provided beside the opening 24.

[d] Transport Unit

Figure 10:
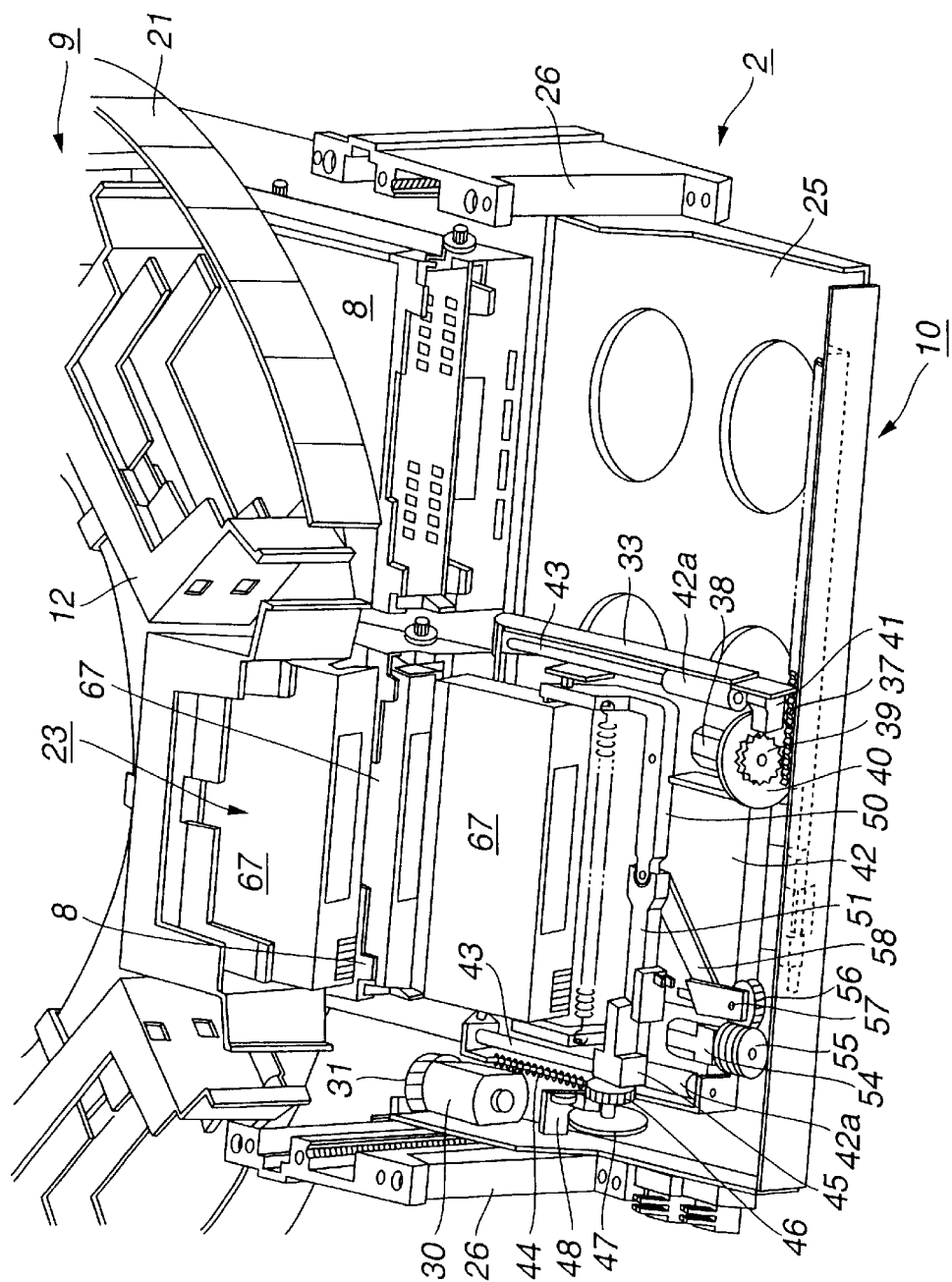
FIG. 10 is a perspective view of the basic unit of the recording/playback apparatus shown in FIG. 1, illustrating the relation between the cassette shelf, drive and transport mechanism.

Referring to FIGS. 2, 3 and 10, the transport mechanism 10 is located at the rear of the cassette shalf 9 and the drives 8. It is designed to move a tape cassette between the case 12 lying at the rear of the cassette shelf 9 and the drives 8. The structure of the transport mechanism 10 is described below.

[Lift Table]

Figure 9:
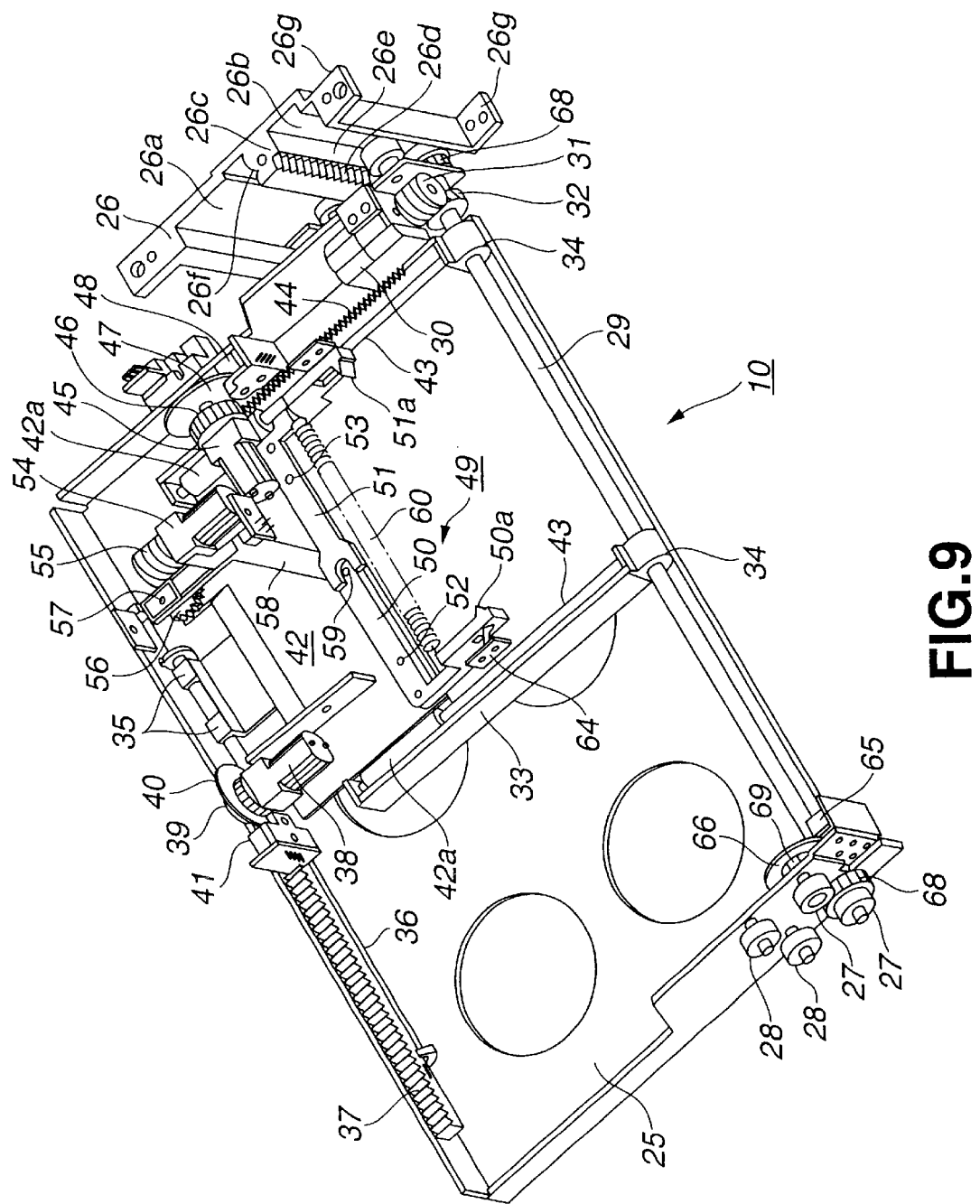
FIG. 9 is a perspective view of the basic unit of the recording/playback apparatus shown in FIG. 1, illustrating the transport mechanism provided in the basic unit.

As FIGS. 9 and 10 show, the transport mechanism 10 comprises a lift table 25 and a pair of rack pillars 26. The rack pillars 26 guide the lift table 25 in both the upward direction and the downward direction. As FIG. 9 shows, the rack pillars 26 each have inside grooves 26*a* and 26*b*, a lack part 26*c*, a rack 26*d*, a rolling surface 26*e*, and a V groove 26*f*. The lack part 26*c* lies between the inside grooves 26*a* and 26*b*. The rack 26*d* and the rolling surface 26*e* are provided at one side of the rack part 26*c*, and the V groove 26*f* on the other side of the rack part 26*c*.

Four coupling parts 26*g* are provided at the corners of the rack pillar 26. The coupling parts 26*g* extend horizontally. Each rack pillar 26 stands upright on a lid (cover) 7 by means of screws screwed into the coupling parts 26*g* from below a lid 7 that closes a through hole (communicating portion) 63 (see FIG. 13) of the bottom plate 5*a*. Each rack pillar 26 is coupled at its upper portion to the lid 7 by means of screws driven from above the lid 7 that closes the through hole 63 (refer to FIG. 16) of the top plate 5*f*.

A configuration for guiding the lift table 25 upwards and downwards along the rack pillars 26 will be described. As FIG. 9 shows, a pair of guide rollers 27 that can roll on the rolling face 26*e* are mounted for rotation at upper and lower portions of each of left and right portions of the lift table 25 adjacent the front face. A pair of guide rollers 28 are provided on the left and right side of the lift table 25. These rollers 28 can roll in the V-shaped groove 26*f* to move upwardly and downwardly to position the lift table 25 in the leftward and rightward directions. Thus, the rack part 26*c* is held between the two sets of guide rollers 27 and 28 to position the lift table 25 in the leftward and rightward directions.

The structure for driving the lift table 25 will be described. As FIG. 9 shows, the lift table 25 is fastened to a connection shaft 29. A pair of pinions 68 coupled integrally to the ends the connection shaft 29. The pinions 68 are set in mesh with the left and right racks 26*d*. A motor 30 is mounted on one side of the lift table 25. A worm gear 31 is coupled to an output shaft of the motor 30 and held in mesh with the helical gear 32 that is secured on the connection shaft 29. An encoder 65 is mounted on the lift table 25, for detecting the position of the lift table 25. The encoder 65 has a rotary plate 66 that are connected to the connection shaft 29 through a gear 60.

[Slide Table]

The slide table 33 is mounted on the lift table 25 and can move in the leftward and rightward directions. The connection shaft 29, which function as a guide as well, extends through a pair of slide bearings 34 at a front of the slide table 33. A guide rod 36 is mounted on the lift table 25 and extends through a pair of slide receivers 35 that are fixed to the back of the slide table 33. The slide table 33 can slide and move to the left and the right along the connection shaft 29 and the guide rod 36.

The structure for driving the slide table 33 will be described. A rack 37 is formed integral on the back of the lift table 25. The guide rod 36 is provided below the rack 37. A motor 38 is secured the slide table 33. A driving gear 39 is coupled to an output shaft of the motor 38 and held in mesh with the rack 37. A rotary plate 40 is formed integral with the driving gear 39. An encoder 41 is provided to detect the number of times the rotary plate 40 rotates.

[Transfer Table]

A transfer table 42 is mounted on the slide table 33 and can move back and forth toward the inner gate 23 and the drive 8. A pair of guide rods 43 are fixed to left and right parts of the slide table 33. The guide rods 43 extend in the forward and backward directions, respectively. They pass through the left and right bearing parts 42*a* of the transfer table 42, respectively, to support the transfer table 42 and allow the same to move back and forth.

The structure for driving the transfer table 42 will be described. A rack 44 is mounted and fixed on the right side of the slide table 33. A motor 45 is mounted on the right side of the transfer table 42. A driving gear 46 is coupled to an output power shaft of the motor 45 and held in mesh with the rack 44. A rotary plate 47 is formed integral with the driving gear 46. An encoder 48 is provided to detect the number of times the rotary plate 47 rotates.

[Clamp Means]

The clamp means 49 is mounted on the transfer table 42, for clamping a tape cassette. The configuration of the clamp means 49 will be described. A pair of pickers 50 and 51 that can pivotally move are secured to the transfer table 42 by a pair of fixed studs 52 and 53 that stand upright on the transfer table 42. The pickers 50 and 51 are L-shaped. The pickers 50 and 51 have pawls 50a and 51a, respectively. The pawls 50a are formed on the inner side of the picker 50, and the pawl 51a is formed on the inner side of the picker 51. The pawls 50a and 51a can fit into the recesses made in the opposite sides of a tape cassette. A motor 54 is mounted on the transfer table 42. A worm 55 is coupled to the output shaft of the motor 54 and held in mesh with a worm wheel 56. A pin 57 stands upright at the eccentric position of the worm wheel 56. The pin 57 is fitted in an end portion of an L-shaped lever 58. Another pin 59 stands upright at the other end portion of the L-shaped lever 58. The pickers 50 and 51 are supported for pivotal motion at inner end portions thereof on the pin 59. A spring 60 stretches between the pickers 50 and 51, biasing the outer ends of the pickers 50 and 51 to be closed. A pair of sensors 64 are fixed in the proximity of the guide rods 43 provided on the slide table 33. The sensors 64 can detect the pickers 50 and 51 passing by them, as they move back and forth on slide table 33.

[e] MIC Antenna

Each tape cassette incorporates a memory means, or a memory in cassette (hereinafter referred to as "MIC"). The MIC stores management data. The recording/playback apparatus has a transmitting/receiving means that can receive and transmit data signals from and to the MIC via MIC antennas 77, though it does not contact the tape cassette, and can supply data to the control circuit section 69. The MIC antennas 77 are provided in the same numbers as the cases 12 that are laid one upon another and are located at one position at least, on the circumference of the cassette shelf 9. Each MIC antenna 77 lies in the case 12 and is positioned near the cassette shelf 9. The MIC antenna 77 can therefore exchange data with a MIC provided in the tape cassette that has been inserted into the case 12 via the inlet port 24, before this tape cassette is transported to the transport mechanism 10 as the table 11 is rotated.

That is, the MIC antenna 77 can transmit and receive data to and from the MIC provided in the tape cassette that is approaching from the inlet port 24 to the transport mechanism 10. Hence, when the tape cassette reaches the transport mechanism 10, the data has been read from the MIC and transferred to the control circuit section 69.

The transport mechanism 10 comprises the barcode reader 78. The barcode reader 78 can optically read the code (i.e., barcodes) on each tape cassettes, obtaining the information represented by the code. The barcode reader 78 transmits the information to the control circuit section 69.

The control circuit section 69 receives the data read from the MIC of any tape cassette, from the transmitting/receiving means. If it receives no information from the barcode reader, or if no barcode is provided on the tape cassette, the control circuit section 69 processes at least a part the data transmitted from the transmitting/receiving means and uses this part of the data as information about the tape cassette.

Figure 11:
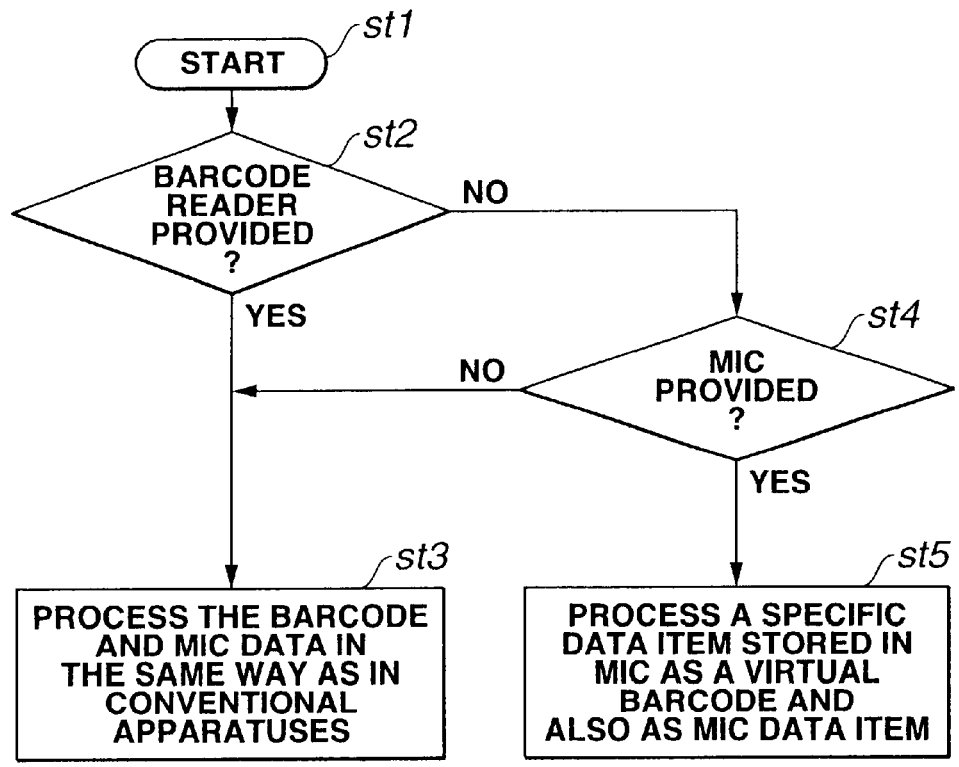
FIG. 11 is a flowchart explaining how MIC data is processed in the recording/playback apparatus according to the invention.

In other words, the control circuit section 69 starts operating in step st1 as shown in the flowchart of FIG. 11, when the cassette-in detection sensor 86 detects that a tape cassette has been inserted into the case 12 through the inlet port 24. In step st2, the section 69 determines whether the barcode reader has transmitted information. If YES in step st2, the operation goes to step st3. If NO in step st2, the operation goes to step st4. In step st3, the section 69 processes the information transmitted from the barcode reader, as barcode information, and the data transmitted from the transmitting/receiving means, as MIC data. In step st4, the section 69 determines whether data has been transmitted from the transmitting/receiving means. If YES, the operation advances to step st5. If NO, the operation goes to step st3. In step st3, no data is processed because the control circuit section 69 has received data from neither the barcode reader nor the transmitting/receiving means. In step st5, the section 69 processes the data received from the transmitting/receiving means as MIC data, and a part of the MIC data as barcode data. In this case, the barcode data is equivalent to one read from a virtual barcode.

[f] MIC Data Configuration

The configuration of the MIC data stored in the tape cassette will be described. The MIC data is stored in fields FL1 to FL4.

More precisely, various data items about the manufacture of the tape cassette, the data about the tape initialized, the data about each partition, and the like are written in these fields FL1 to FL4.

Field FL1 stores manufacture information. That is, this field is a manufacture part for storing various data items concerning the manufacture of the tape cassette.

Field FL2 stores memory management information. It is a drive-initializing part for storing initialization information and the like.

Field FL3 stores a volume tag. More correctly, the basic management information for the entire tape cassette is stored in this field.

Field FL4 is a memory-free pool region, in which additional management information can be recorded. In the memory-free pool, the recording/playback history and other various data items can be stored, if necessary. In the memory-free pool, data is stored in units called "cells."

Of the manufacture information stored in field FL1, the first byte is manufacture part checksum. The manufacture part checksum is the checksum of the manufacture information. The manufacture part checksum has been generated at the time of manufacturing the tape cassette.

The manufacture part consists of various data items, ranging from the MIC type to write protected data byte count. The "reserved" is a region in which any data can be recorded whenever necessary in the future. This holds true for the description that follows.

MIC type describes the type of the MIC provided in the tape cassette and the data format in which information should be recorded on the tape rolled in the cassette. The MIC type shall be defined later.

MIC manufacture date describes the date (and time) when the MIC was manufactured.

MIC manufacture line name identifies the line in which the MIC has been manufactured.

MIC manufacture plant name indicates the factory where the MIC has been manufactured.

MIC manufacture name is the name of the company that has manufactured the MIC.

MIC name is the information about the vendor of the MIC.

Cassette manufacture date, cassette manufacture line name, cassette manufacture plant name and cassette manufacture name are data items about the tape cassette and correspond to the similar data items about the MIC.

OEM customer name is the information concerning the OEMs (Original Equipment Manufacturers).

Physical tape characteristic ID is the information about the physical properties of the magnetic tape, such as material, thickness and length.

Maximum clock frequency represents the highest clock frequency that the MIC can have.

Maximum write cycle is the data that shows how many bytes of data the MIC can transfer at a time to the drives 8. The amount of data that can be so transferred depends on the physical properties of the nonvolatile memory used as the MIC.

MIC capacity is the storage capacity of the MIC.

Write protect start address is used to inhibit the writing of data into some regions of the MIC. That is, this address is the address of the first of the regions in which data cannot be written.

Write protect byte count describes the number of bytes that may not be written in the regions the first of which is designated by the right protect start address.

The configuration of the memory management information stored in field FL2 will be described. The memory management information contains checksum data, i.e., the drive initializing part of the memory management information. The drive initializing part serves as the drive initializing checksum.

The data items, ranging from the MIC logical format to the free-pool bottom address, are described as data that actually constitutes the memory management information.

First, the ID number of the MIC logic format is stored as MIC logical format type. The MIC format can be selected from the group consisting of, for example, basic MIC format, firmware-update tape MIC format, reference tape MIC fornmat, cleaning cassette MIC format and the like. The MIC format selected represents the ID number of the tape cassette.

The absolute volume-map pointer is a data item that represents a pointer indicating the start address of absolute volume-map information cell.

The user volume note-cell pointer is the start address of a user volume note cell, i.e., the storage region on the tape, into and from which the user can write and read data via SCSI.

The user partition-note cell pointer is the start address of a user partition-note cell, i.e., a the storage region in a partition, into and from which the user can write and read data via SCSI. Two ore more user partition-note cells may be stored. In this case, the user partition-note cell pointer indicates the start address of the first user partition-note cell.

The partition-information cell pointer is the start address of partition-information cell #0.

The partition information is written in the memory-free pool, in the form of as many data items as the partitions formed on the magnetic tape. All partition-information cells #0 to #N are linked by pointers. That is, the partition-information cell pointer indicates the address of partition #0. The pointer of any other partition-information cell is contained in the partition-information cell that immediately precedes the cell.

The pointers described above (i.e., absolute volume-map pointer, user volume note-cell pointer, user partition note cell pointer and partition-information cell pointer) manage the position of each data item in the field FL4.

The volume attribute flag is a one-byte flag that inhibit logic writing into the MIC. More precisely, the MIC header flag permits or inhibits the writing of data in the manufacture part. Alternatively, the MIC header flag permits or inhibits the wiring of data in any part other than the manufacture part.

The free-pool top address and the free-pool bottom address indicate the start address and end address of the memory-free pool recorded in the field FL2. The region for the memory-free pool changes in position as the partition information, the user partition note and the like are written or erased. Every time the region changes in position, the free-pool top address and the free-pool address are updated.

The configuration of the volume tag of field FL3 will be described. At the head of the volume tag, checksum data about the volume information is stored. This checksum data is the volume information checksum that is the basic management information concerning the entire tape cassette.

Further, accumulative partition information checksum is stored. This checksum is concerned with the accumulative partition information describing the history of the tape cassette that starts at the manufacture thereof.

The volume note checksum and the volume note are followed by a cartridge serial number. The cartridge serial number is a 32-character text data composed of ASCII codes.

The manufacturer ID is a manufacturer identifier. It is the code number assigned to the manufacturer of the tape cassette.

The secondary ID is a secondary identifier. This ID is a one-byte code that contains the attribute information about the tape.

The cartridge serial-number part checksum is a checksum data item about the cartridge serial number, manufacturer ID and secondary ID.

The specific volume tags 1 to 13 are reserved areas, each composed of, for example, 26 bytes.

The cells stored in field FL4 will be described. As indicated earlier, the partition information cell, the user partition-note cell and the like are stored in the field FL4.

Each cell is composed of 8-byte link information and n-byte data. (The amount of the data varies with the type of the cell.) Every cell has 8-byte link information.

A 1-byte cell checksum is provided as a checksum for the data contained in each cell.

The size of each cell is represented by a 2-byte cell size data.

The previous cell pointer and the next cell pointer are data items that constitute linkage data (i.e., the data that forms a link structure). These cell pointers designates, respectively, the first and last of the cells of the same type that are linked together.

Among cells of such configuration are: partition information cells, absolute volume-map information cells, user volume note cells, and user partition note cells. The partition information cells have a fixed size. The cells of the other types have a variable size.

Partition information cells, whose size is fixed, will be described. Each partition information cell comprises 8-byte link information and 56-byte data. Of the 56-byte data, 8 bytes are a partition memo, while the remaining 48 bytes are partition information.

The partition information (i.e., system log) includes various data items regarding the use history of that partition of the magnetic tape that corresponds to the cell. The drives 8 can use these data items to manage the recording/playback operation they perform.

The 4-byte previous groups written is the data that shows the number of data groups physically recorded on the magnetic tape since the last updating of the partition information.

The 4-byte total groups written are the data that the number of all data groups recorded thus far for the partition. The number of data groups is accumulated until, for example, the tape cassette comes to the end of its lifetime and is therefore discarded.

The previous groups written and the total groups written are increased in value as more and more data groups are recorded by the system controller of either drive 8, as long as the drive 8 keeps recording data on the magnetic tape.

The 3-byte previous groups read is the data that represents the number of groups physically read since the last updating of the partition information.

The 4-byte total group read is the data that indicates the number of groups read thus far for the partition.

The 3-byte total rewritten frames is the data that indicates the number of frames demanded to be written again for the partition, in accordance with a read-after-write command (hereinafter referred to as "RAW").

The MIC data configuration described above is nothing more than an example. The arrangement of data items, the setting of regions, the contents of data, the data size are not limited to those specified above.

[g] Replacement of the Drives

In the recording/playback apparatus, either drive 8 can be replaced by a new one. To this end, the front panel 5*d* is removed. The drive replacement is so-called "HotSwap," which can be accomplished with the power switch to the control circuit section 69 kept closed. After the front panel 5*d* is removed from the housing 5, the drive 8 can be pulled forward and removed from the housing 5. When the drive 8 is so removed, it is disconnected from the control circuit section 69. The new drive 8 can then pushed into the housing 5, from the front thereof, and can be connected to the control circuit section 69.

As shown in FIG. 7, the connection and disconnection of the drive 8 and the control circuit section 69 are achieved at the connector 74. The ground pin of the connector 74 is longer than any other pin. Hence, the ground pin is the last to be removed when the connector 74 is pulled out. The ground pin is the first to be connected when the connector 74 is inserted.

The control circuit section 69 performs a process to disconnect the drive 8 from it when the user operates the input means, such as key switches, thus instructing that the drive 8 be disconnected and replaced with a new one. Then, the recording/playback apparatus assumes a standby state. The section 69 causes the LCD display section 62 provided on the front panel 5*d* to display the message that the drive 8 can be disconnected (or removed). The control circuit section 69 causes an indicator such as an LED (Light-Emitting Diode) to show that the drive 8 can be disconnected (or removed). The control circuit section 69 carries out a process to make it possible to use the drive 8 connected, when the user operates the key switches or the like to operate the recording/playback apparatus again.

Figure 12:
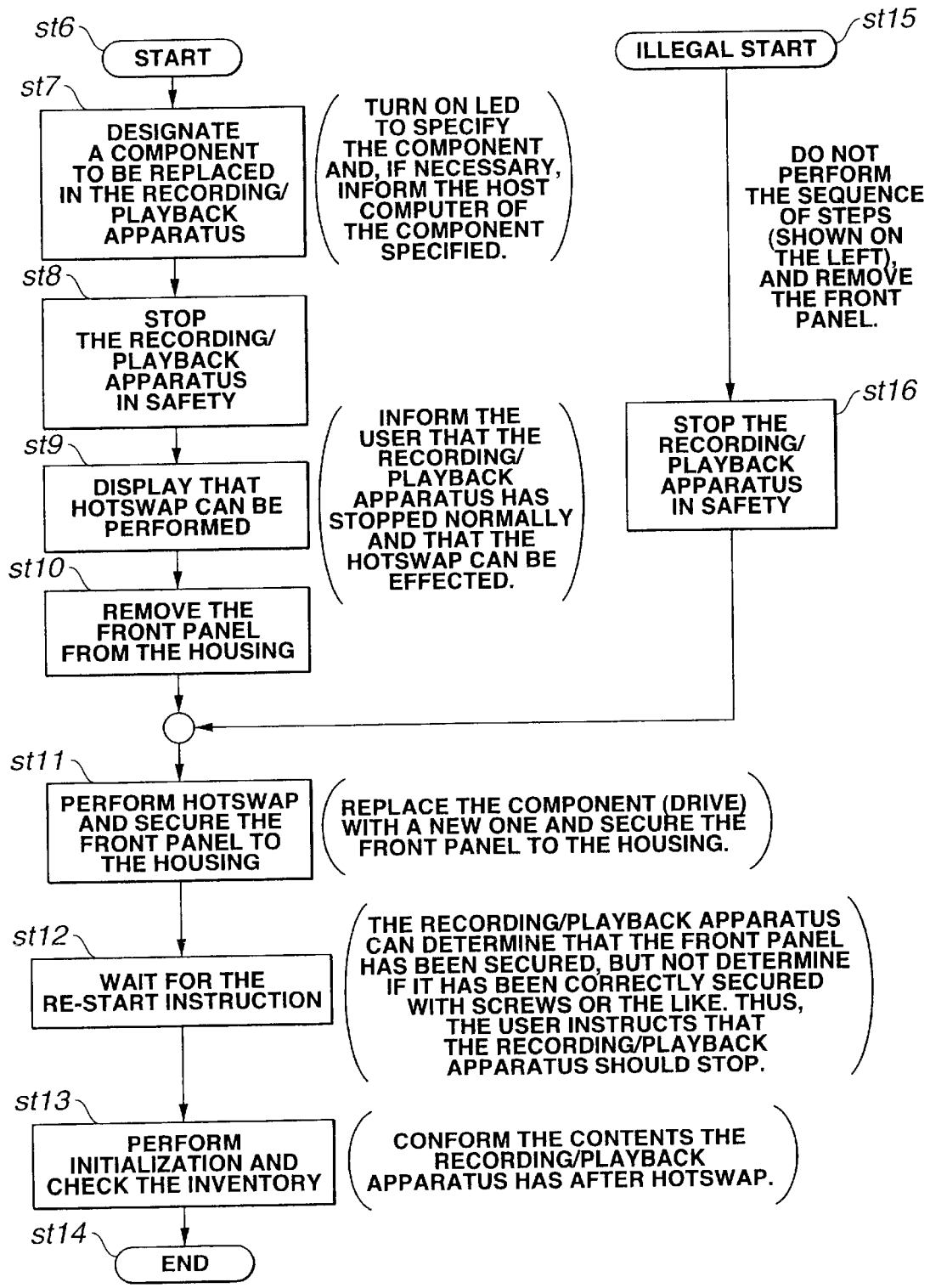
FIG. 12 is a flowchart explaining the sequence of replacing the drive with a new one in the recording/playback apparatus according to the invention.

More specifically, the control circuit section 69 starts operating in step st6 as shown in the flowchart of FIG. 12. In step st7, the user instructs that the recording/playback apparatus prepare for the replacement of one of the drive 8. At the same time, the control circuit section 69 causes the indicator 79 such as an LED (Light-Emitting Diode) to show that the drive 8 can be removed. Then, in step st8, the section 69 stops the recording/playback apparatus in safety. In the next step, i.e., step st9, the section 69 causes the LCD display section 62 provided on the front panel 5*d* to display a message, informing the user that the drive 8 can be removed and that the apparatus remains to operate again. In step st10, the user removes the front panel 5*d* from the housing 5, as shown in FIG. 6. In step st11, the user replaces the drive 8 with a new one and fastens the front panel 5*d* to the housing 5, as illustrated in FIGS. 7 and 8. In step st12, the LCD display section 62 displays the same message as it did to before the front panel 5*d* was removed from the housing 5. That is, the section 62 displays the message that the apparatus remains to operate again. When the user operates the input means such as key switches, thus instructing that the apparatus should operate again, the control circuit section 69 initializes the drive 8 connected to the apparatus, in step st13. If the apparatus operates well, the process is terminated in step st14.

The drive 8 may be removed though the user has not instructed the control circuit section 69 that the drive 8 should be replaced. In this case, the section 69 performs an illegal start process in step st15. In step st16, the section 69 stops the recording/playback apparatus in safety. The operation then goes to step st11.

[3] Expansion Unit

Figure 13:
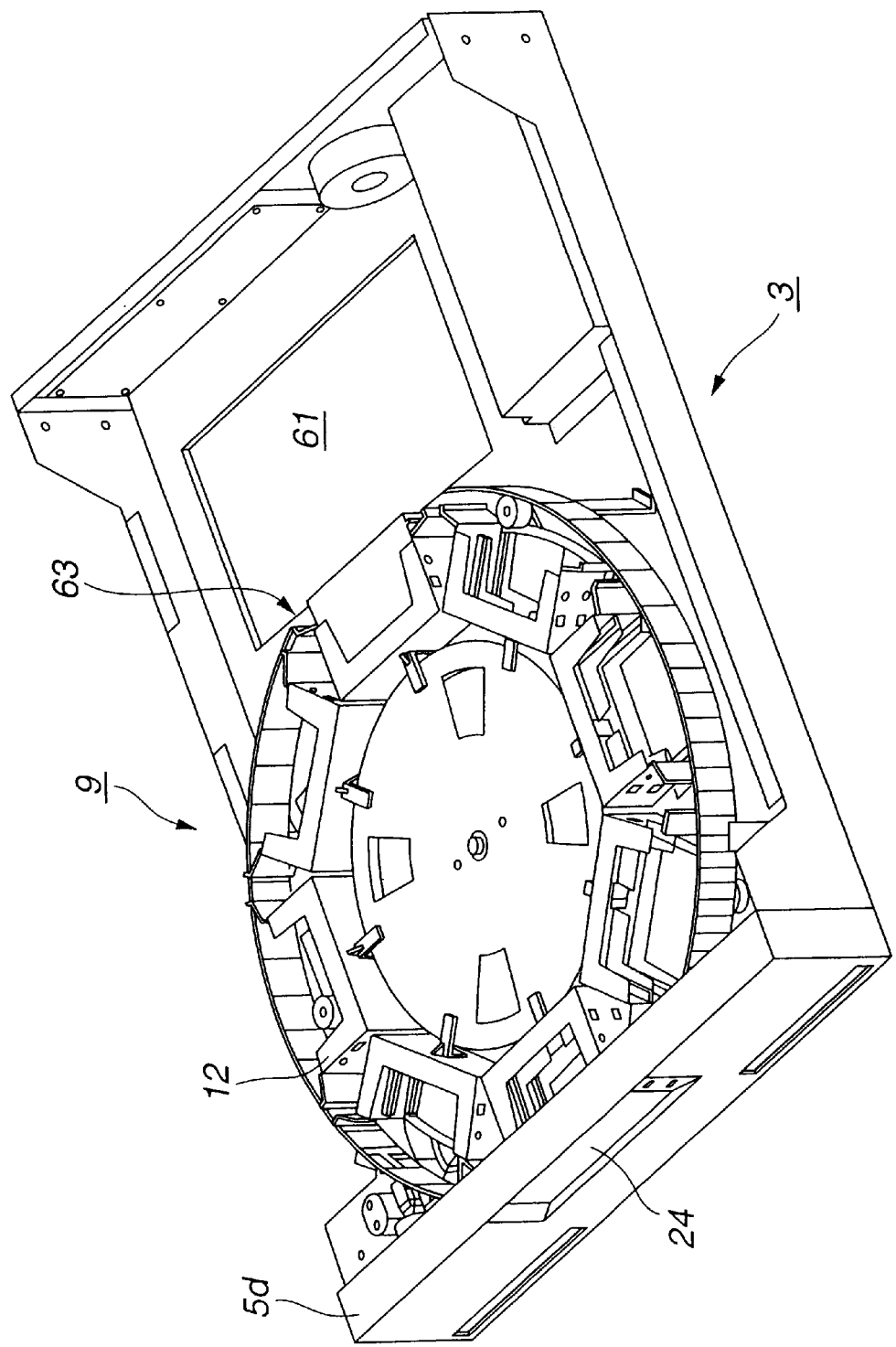
FIG. 13 is a perspective view of an expansion unit for use in the recording/playback apparatus according to this invention.

In the recording/playback apparatus, one or more expansion units can be coupled to the basic unit 2. For example, two expansion units 3 and 4 are coupled to the basic unit 2. As FIG. 13 shows, the expansion units 3 and 4 have a cassette shelf 9, a control circuit section, and a pair of rack pillar 26. The cassette shelf 9 is a storage mechanism for holding a plurality of tape cassettes. The control circuit section is connected to the cassette shelf 9 and controls the cassette shelf 9. The rack pillars 26 are continuous to another pair of rack pillars 26 that work as the first guide. The rack pillars 26 of either expansion unit serve as the second guide for guiding the transport mechanism 10 to the position where the cassette shelf 9 of the expansion units 3 and 4.

The basic unit 2 described above may have but less cases than required to accommodate tape cassettes. In this case, it is then necessary to use an additional cassette shelf 9 or additional shelves. Assume that many additional expansion units are used, laid one upon another on the uppermost expansion unit or the basic unit, i.e., the lowermost unit. Then, much time may be required for transportation of a tape cassette from the uppermost expansion unit 4 to the basic unit 2, i.e., the lowermost unit. It may be desired that one or more drives be provided in the uppermost expansion unit.

Therefore, three different types of expansion units may be considered. A first type includes an expansion unit wherein only a cassette shelf 9 is provided in the housing. A second type has only one drive 8 provided in the housing. In the third type, both of the cassette shelf 9 and one drive 8 are provided in the housing 5. Once the three expansion units are coupled together and one of them is coupled to the basic unit 2, a transport space is provided between any two adjacent units, allowing the transport mechanism 10 of the basic unit 2 to function in any units coupled together.

As FIG. 13 shows, each expansion unit 3 shown in FIG. 17 includes, in the housing 5 thereof, a cassette shelf 9 and a pair of drives 8 (not shown). The cassette shelf 9 has two stages of cases 12 similar to that described above. The drives 8 are located below the cassette shelf 9. These components are similar to those of the basic unit 2. The expansion unit 3 has a transport space 61 in which the lift table 25 of the transport mechanism 10 provided in the basic unit 2 can move upwardly and downwardly. Thus, a tape cassette can be transported in the inside of the expansion unit 3. Further, the expansion unit 3 includes a pair of rack pillars 26 (not shown) that is second guide for guiding the lift table 25 up and down.

Figure 14:
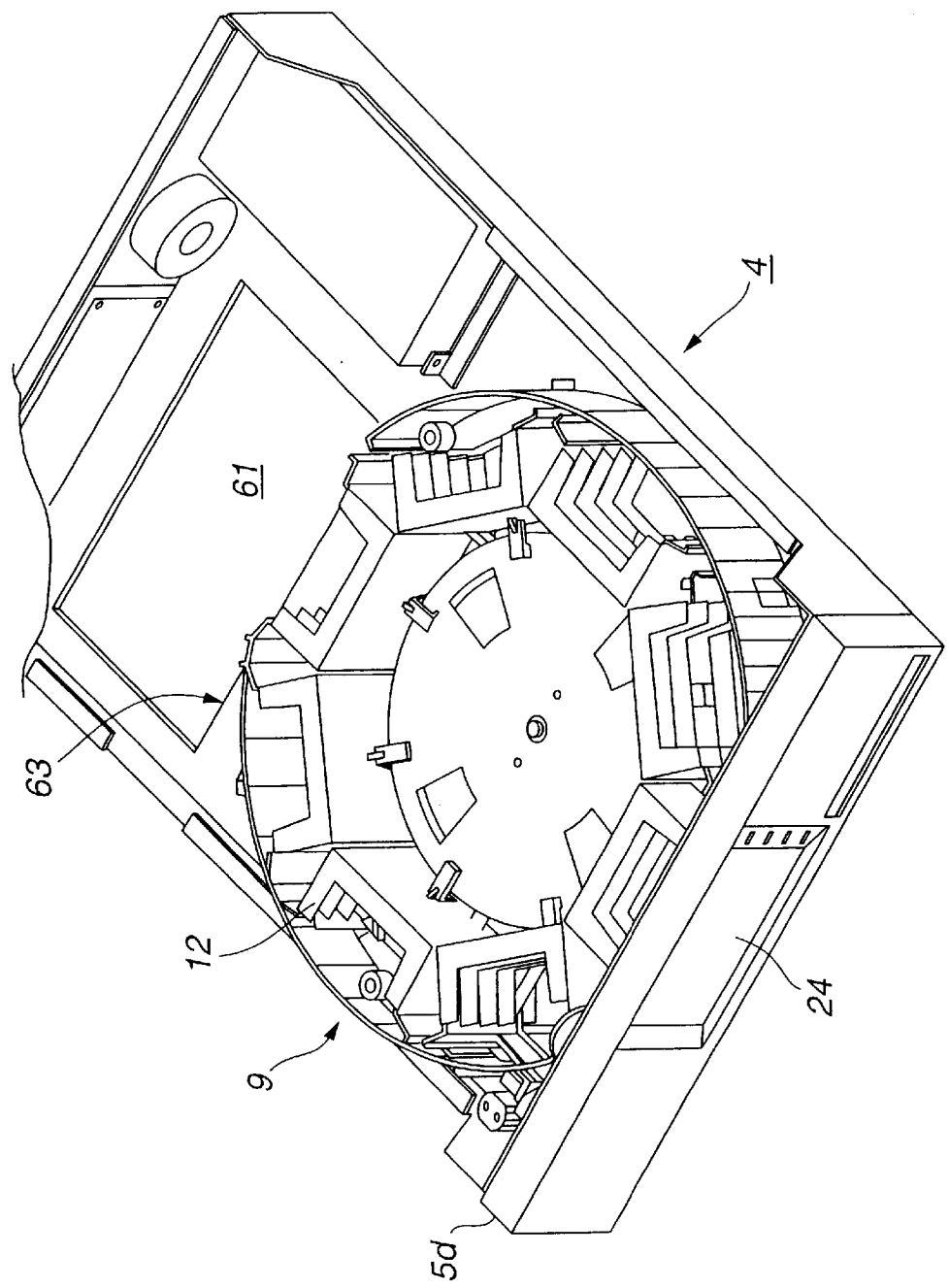
FIG. 14 is a perspective view of another type of an expansion unit for use in the recording/playback apparatus according to this invention.

The uppermost expansion unit 4 shown in FIG. 17 will be described. As FIG. 14 depicts, the expansion unit 4 includes no drive, but has more cases 12 on the cassette shelf 9 than otherwise. Thus, the cassette shelf 9 of the expansion unit 4 has four cases 12 as seen in FIG. 14. The expansion unit 4 further has a transport space 61 for allowing a tape cassette to be transported therein similarly to the expansion units 3 shown in FIG. 7. The expansion unit 4 further includes a pair of rack pillars 26 (not shown) that is the second guide for guiding the lift table 25 up and down.

In the expansion unit 4, since the cassette shelf 9 includes the four cases 12, the inlet opening 24 has a height corresponding to the height of the four cases 12 laid one on another. Note that the expansion units 3 and 4 do not include the LCD display section 62.

[4] Coupling Section and Junction Between Basic Unit and Expansion Unit

As described above, such a through hole 63 is formed at mutually corresponding positions of the bottom plate 5*a* and the top plate 5*f* of each units 2, 3 and 4 of the housings 5, as shown in FIG. 16. The housings 5 of the basic unit 2 and expansion units 3 and 4, all shown in FIG. 17, communicate with each other at the through holes 63 (communicating portions). Therefore, the transport spaces 61 of the housing 5 are mutually connected.

Figure 15:
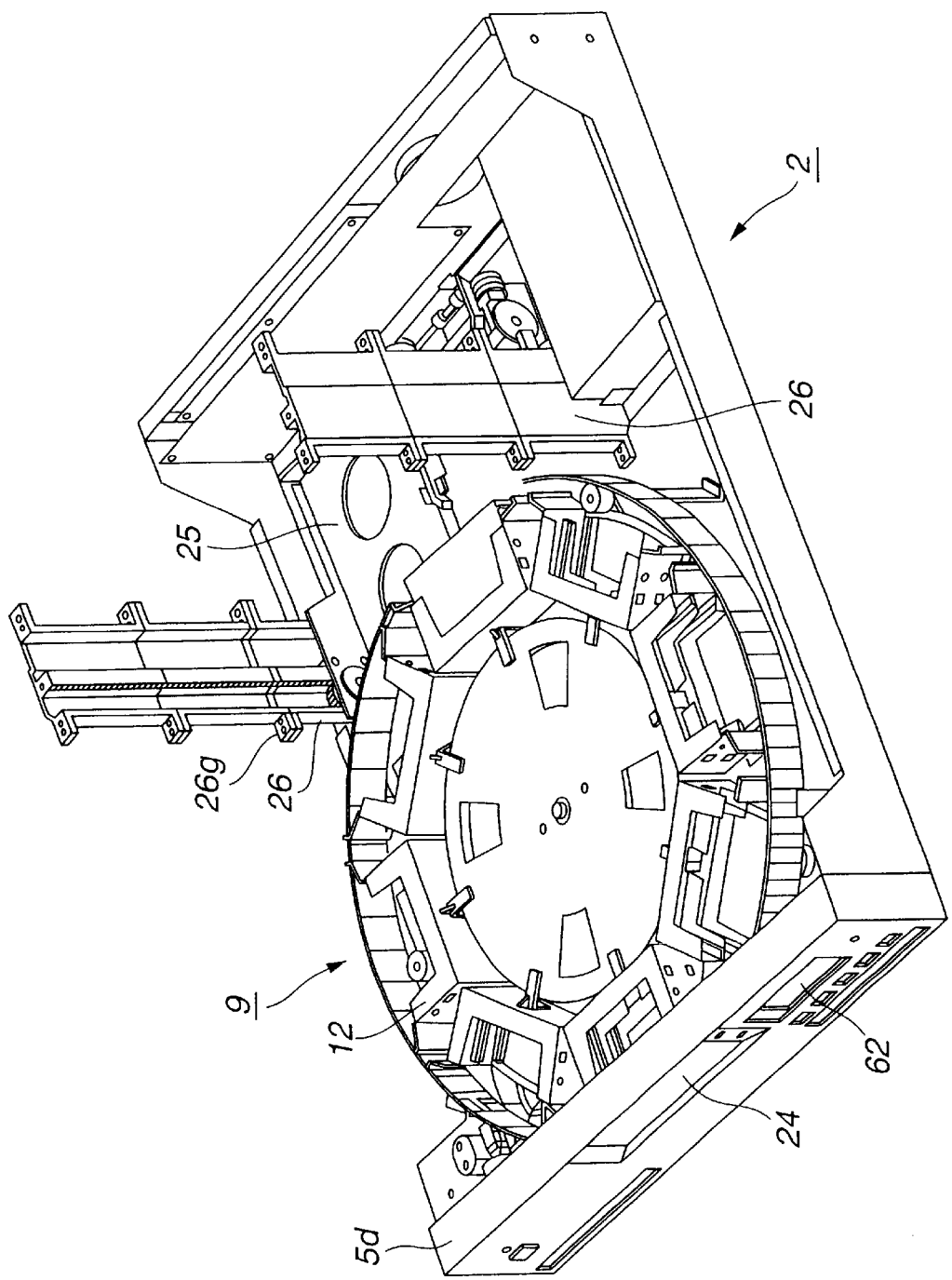
FIG. 15 is a perspective view of the basic unit of the recording/playback apparatus of the invention, showing a plurality of rack pillars provided on the basic unit.

To connect an expansion unit or units 3 and/or 4 to the basic unit 2, additional pairs of rack pillars 26 are provided, in the same number as expansion units 3 and/or 4, in the transport spaces 61. The additional rack pillars 26 extend upwardly. More specifically, as shown in FIG. 15, the coupling portions 26*g* of the corresponding rack pillars 26 are coupled by screws (not shown) such that the rack pillars 26 project from the basic unit 2 upwardly, immediately before the expansion units 3 and/or 4 are connected to the basic unit 2, The rack pillars 26 for the expansion units 3 and 4 have a length that is almost equal to the height of the housing 5. The rack pillars 26 for the basic unit 2 have a length that is a little shorter than the height of the housing 5. From the condition of FIG. 15, the expansion units 3 and 4 are placed one upon the other on the basic unit 2 and are coupled to each other as shown in FIG. 17. Screws are driven into the coupling portions 26*g* from above the lid 7 to couple the uppermost rack pillars 26 to the lid 7 after the lid 7 has been coupled to the top plate 5*f* of the housing 5. The lift table 25 of the basic unit 2 can thereby move up to the uppermost expansion unit 4.

The control circuit section 69 provided in the basic unit 2 is connected to the control circuit sections provided in the expansion units 3 and 4 and coupled to the basic unit 2 by means of a cable ("RS232C" connection). Since the control circuit sections are connected to each other in this manner, the control circuit section 69 in the basic unit 2 can determine how may expansion units 3 and/or 4 are connected to the basic unit 2 and what kind of expansion unit is coupled in each stage.

In the recording/playback apparatus, one or more expansion units 3 and/or 4 may be coupled to the basic unit 2. In this case, when the lift table 25 of the transport mechanism 10 is positioned within the basic unit 2, the control circuit section 69 controls the positions and operation of the slide table 33 and the transfer table 42 of the transport mechanism 10 in accordance with the positional reference point of the basic unit 2. When the lift table 25 of the transport mechanism 10 is in an expansion unit 3 or 4, the control circuit section 69 controls the positions and operation of the slide table 33 and transfer table 42 of the transport mechanism 10 in accordance with the positional reference point of the expansion unit 3 or 4.

Figure 20:
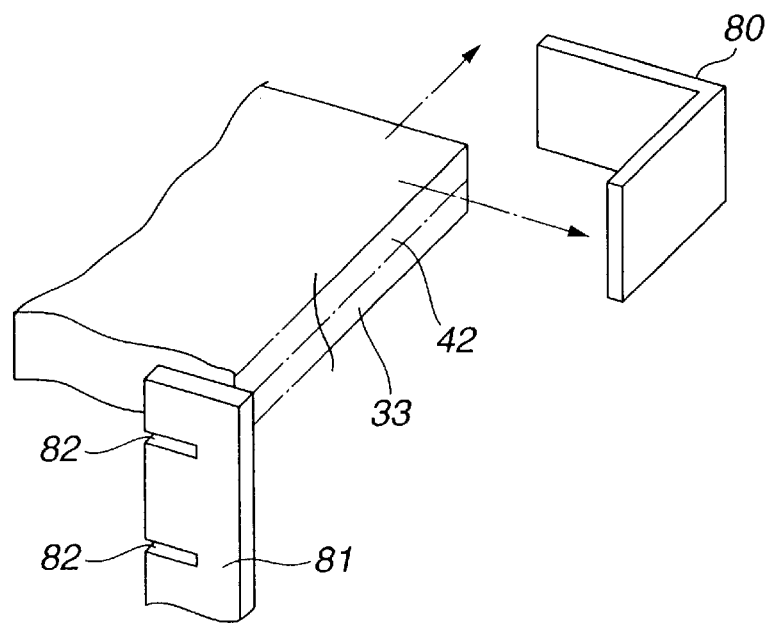
FIG. 20 is a perspective view illustrating a positional reference point in the recording/playback apparatus according to the invention.

The positional reference point of each of the units 2, 3 and 4 is provided on the bottom plate 5*a* of the unit 2, 3 or 4 and serves as a reference for the positions of the drives 8 and the cassette shelf 9 of the unit 2, 3 or 4. Accordingly, even if the rack pillars 26 coupled to each other have some positional displacement, the slide table 33 and the transfer table 42 are controlled to an accurate position with respect to the drives 8 and the cassette shelf 9 in each unit 2, 3 or 4. This is because the control circuit section 69 controls the positions and operation of the slide table 33 and the transfer table 42 of the transport mechanism 10 based on the positional reference point of each unit 2, 3 or 4, The positional reference point is provided with regard to the origin of moving operation of the slide table 33 and the transfer table 42 of the transport mechanism 10 and the vertical position of each case 12 of the cassette shelf 9 as seen in FIG. 20. The origin of moving operation of the slide table 33 and transfer table 42 can be detected as a position when each of the slide table 33 and the transfer table 42 is moved in a predetermined direction until it collides with a member 80 provided on the bottom plate 5*a* and indicative of the positional reference point. The vertical position of each of the cases 12 of the cassette shelf 9 can be detected as a position of a slit 82 of a member 81 provided on the bottom plate 5*a* and indicative of the positional reference point.

Figure 21:
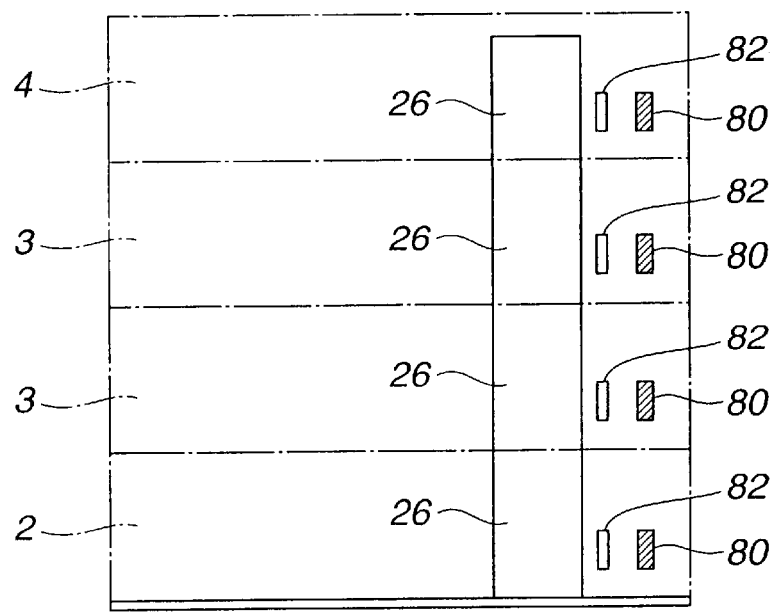
FIG. 21 is a side view showing the positional reference point each unit of the recording/playback apparatus according to the invention.

To couple the expansion units 3 and/or 4 to the basic unit 2, the power supply to the control circuit sections is cut. After the coupling of the units 2, 3 and 4 is completed, the power switch to the control circuit section 69 is closed. The control circuit section 69 immediately executes an initialization process of detecting and storing the positional reference points 80 and 82 of the units 2, 3 and 4 as illustrated in FIG. 21.

Figure 22:
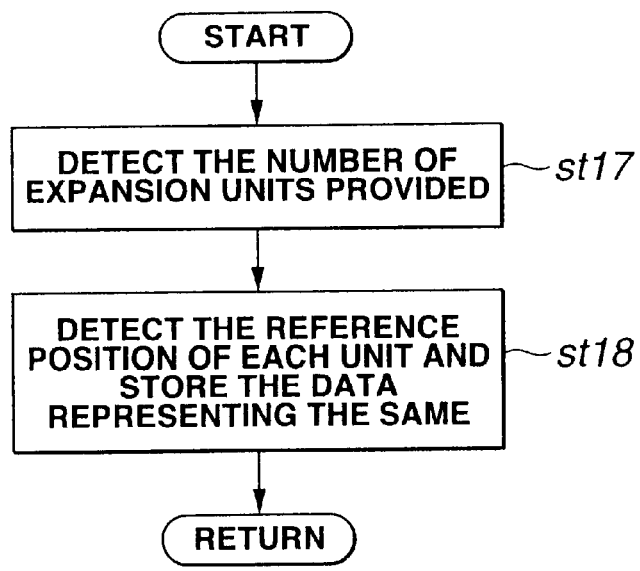
FIG. 22 is a flowchart explaining the initialization process performed in the recording/playback apparatus according to the present invention.

To perform the initialization process, the control circuit section 69 of the basic unit 2 first communicates, in step st17 (see the flowchart of FIG. 22), with the control circuit sections of the expansion units 3 and 4 coupled to the basic unit 2 to discriminate and store the number of expansion units 3 and 4 coupled to the basic unit 2.

In step st18, the control circuit section 69 of the basic unit 2 detects and stores the positional reference point of each of the basic unit 2 and the expansion units 3 and 4. The positional reference point of each unit 2, 3 or 4 is detected by moving the lift table 25 of the transport mechanism 10 in the unit 2, 3 or 4, by moving, in each unit 2, 3 or 4, the slide table 33 and the transfer table 42 until they abut on the member indicative of the positional reference point, and by detecting the position of the slit in the member indicative of the positional reference point for each unit 2, 3 or 4.

Once such an initialization process as described above is completed, the control circuit section 69 can control the positions and operation of the slide table 33 and transfer table 42 of the transport mechanism 10 for each unit 2, 3 or 4 based on the positional reference point stored in each of the units 2, 3 and 4.

Such an initialization process as described above may not be performed if the power switch is closed. Instead, the positional reference point of the basic unit 2 may be first detected and recorded, and the positional reference point of the expansion unit 3 or 4 may be detected and recorded when the lift table 25 of the transport mechanism 10 is moved in any of the expansion units 3 and 4.

Figure 23:
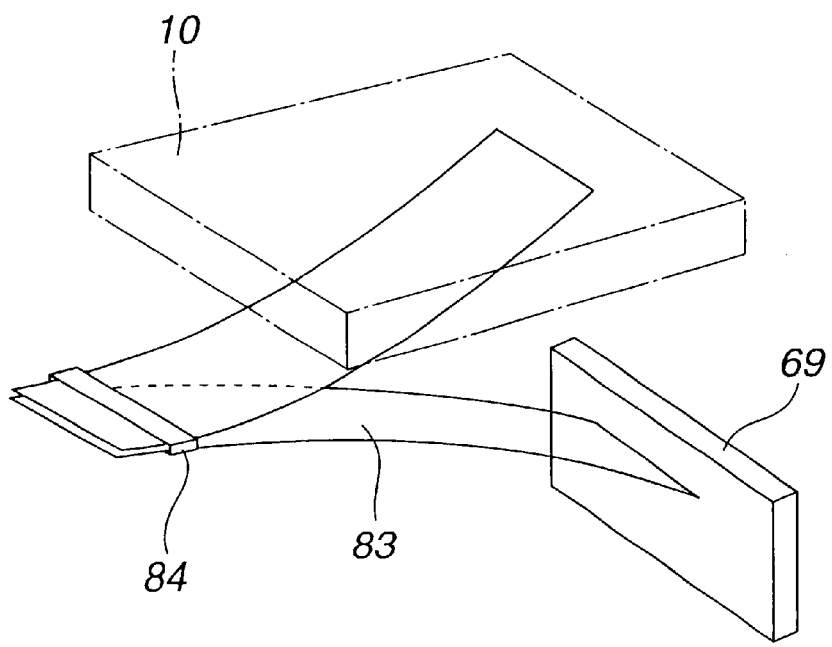
FIG. 23 is a perspective view of the flat cable that connects the transport mechanism and the control circuit section in the recording/playback apparatus according to this invention.

As shown in FIG. 23, the control circuit section 69 and the transport mechanism 10 of the basic unit 2 are connected by a flat cable 83 of an elongated belt-like configuration. The flat cable 83 comprises a plurality of conductors that expend in parallel and joined together with an insulating member.

Figure 24:
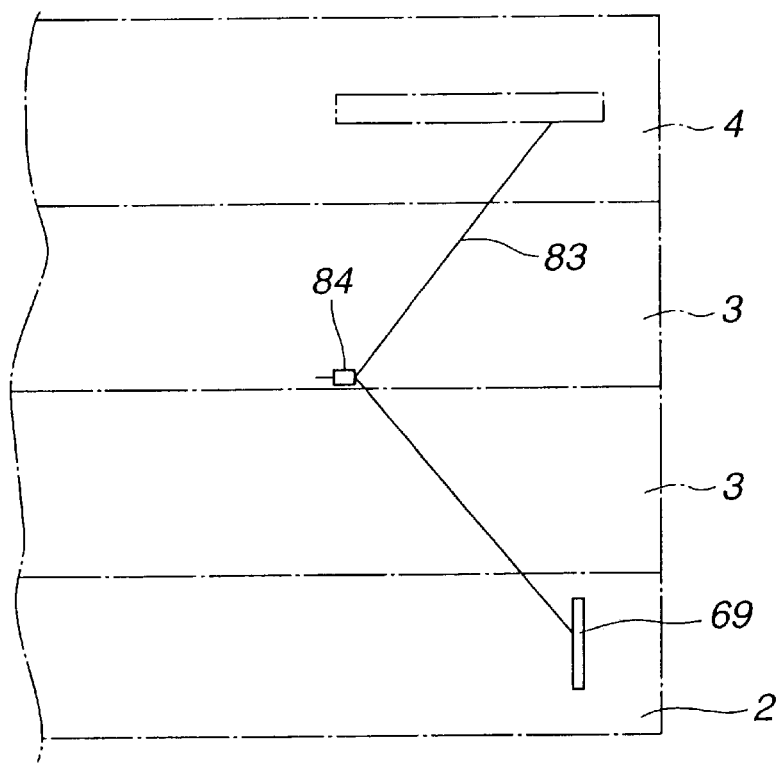
FIG. 24 is a side view of the flat cable that connects the transport mechanism and the control circuit section in the recording/playback apparatus according to this invention.

The flat cable 83 is bent or folded over at a substantially central portion thereof in the longitudinal direction and held at a portion in the proximity of the folded portion thereof by a fold holding member 84. As FIG. 24 shows, the angle between the opposite end portions of the flat cable 83 with respect to the folded portion varies in accordance with the distance between the control circuit section 69 and the transport mechanism 10 of the basic unit 2 when the lift table 25 of the transport mechanism 10 is moved in an expansion unit 3 or 4.

Accordingly, neither the flat cable 83 for interconnecting the control circuit section 69 nor the transport mechanism 10 of the basic unit 2 need to be replaced with a new one in the recording/playback apparatus so long as the additional expansion units provided remain to exceed a predetermined number.

Figure 25:
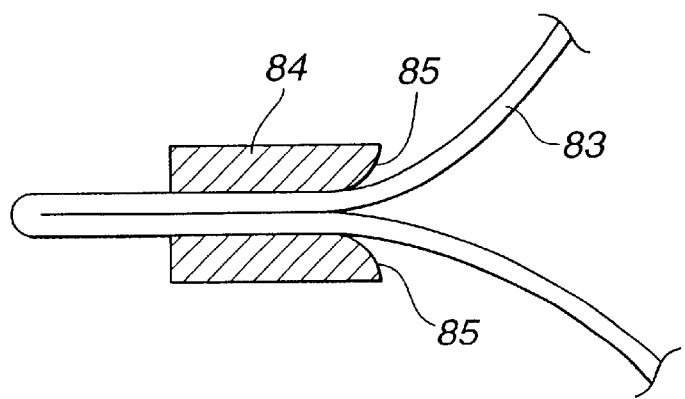
FIG. 25 is a vertical sectional view of the essential part of the flat cable that connects the transport mechanism and the control circuit section in the recording/playback apparatus according to this invention.

The fold holding member 84 is a molding of synthetic resin. It has a portion 85 that is pressed by the flat cable 83 when the opposite ends of the flat cable 83 are opened. As FIG. 25 shows, this portion 85 is a cylinder that has an axis parallel to a principal plane of the flat cable 83 and perpendicular to the longitudinal direction of the flat cable 83. Even if the angle between the opposite end portions of the flat cable 83 increases around the folded portion, the flat cable 83 contacts the portion 85 of the cylindrical face shape. Hence, the flat cable 83 does not receive such a stress as may cause disconnection of the wires.

Figure 26:
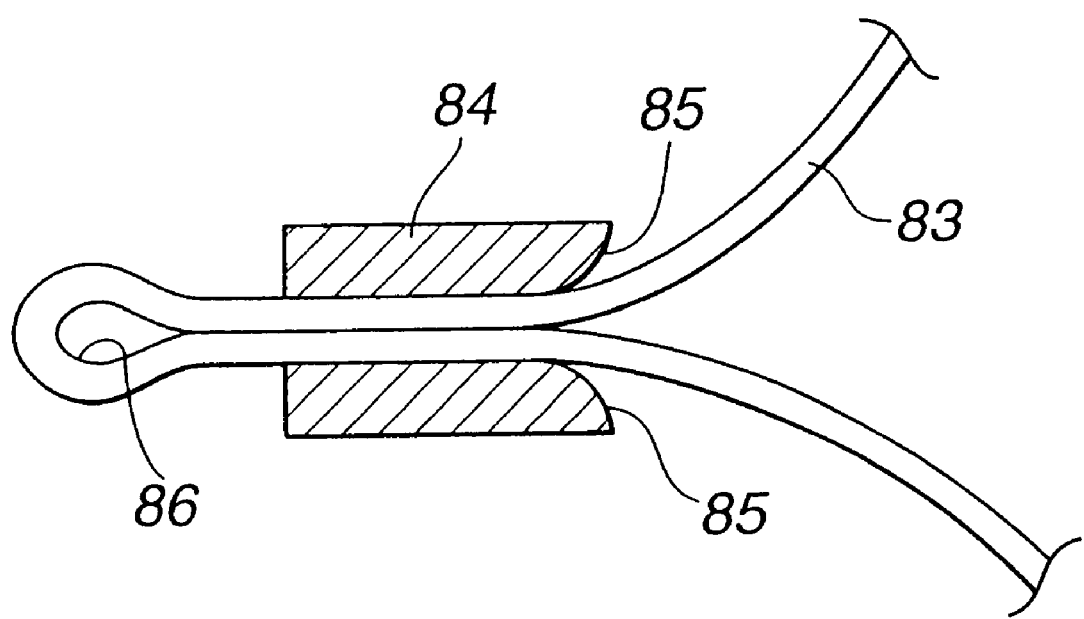
FIG. 26 is another vertical sectional view of the essential part of the flat cable that connects the transport mechanism and the control circuit section in the recording/playback apparatus according to this invention.

The flat cable 83 may otherwise be curved arcuate at the folded portion thereof as illustrated in FIG. 26. Further, the fold holding member may be made of flexible material.

[5] Operation

How the recording/playback apparatus thus constructed operates will be explained.

[a] Placing and Removal of Tape Cassettes onto and from the Cassette Shelf

To place or remove a tape cassette onto or from the cassette shelf 9, the user pushes an insertion button or a takeout button. Thereupon, one of the cases 12 of the cassette shelf 9 of the basic unit 2 or one of the expansion units 3 and 4 is selected. Then, the table 11 is rotated until the case 12 selected comes to the outer gate 22 that corresponds to the inlet opening 24. The user may then insert a tape cassette into the case 12 through the inlet opening 24 or may remove a tape cassette out of the case 12 through the inlet opening 24.

The table 11 is rotated in the following manner. When the motor 16 shown in FIG. 5 is driven, the rotation of its shaft is transmitted to the center gear 15 through the gear 17. The table 11, which is formed integral with the center gear 15, is rotated. The table 11 is stopped at a desired position. This positioning is performed by the encoder 18 and the position sensor 19.

[b] Removal of a Tape Cassette from the Cassette Shelf

To record or reproduce data on or from the magnetic tape in the tape cassette, the user pushes a selection button to select a tape cassette and a recording button or a playback button. As a result, the tape cassette selected is transported to one of the drives 8. The basic unit 2 and each expansion unit 3 include two drives 8. One of the drives 8, which is positioned nearer to the case 12 of the tape cassette, is selected. Assume that the tape cassette in the upper stage of the lowermost basic unit 2 is selected, and that the drive 8 on the left side as viewed from the front of the basic unit 2 is selected. Then, the user will remove the tape cassette in the following manner.

When the tape cassette is selected, the table 11 is rotated to and stopped at the inner gate 23 as illustrated in FIG. 10. In the meantime, the lift table 25 of the transport mechanism 10 is moved to the inner gate 23. More particularly, the lift table 25 is moves in the following manner. As FIG. 9 shows, the motor 30 is driven, and the rotation of its shaft is transmitted to the pair of pinions 68 through the worm gear 31, helical gear 32 and connection shaft 29. The pinions 68 therefore roll on the racks 26d. When the encoder 65 detects a predetermined position, it generates a stop signal. The stop signal stops the motor 30. The lift table 25 therefore stops moving upwards. Thereafter, the motor 38 is driven, whereby the driving gear 39 rolls on the rack 37. Therefore, the slide table 33 is moved along the guide rod 36 and the connection shaft 29. When the encoder 41 detects a predetermined position, the motor 38 is stopped, stopping the slide table 33. Thereafter, the motor 45 is driven, and the driving gear 46 rolls on the rack 44. The transfer table 42 is therefore moved forward along the pair of guide rods 43 until the pickers 50 and 51 are inserted into the case 12. When the encoder 48 detects that the pickers 50 and 51 have moved between the pair of passage sensors 64 and that the transfer table 42 has reaches a predetermined position, the motor 45 is stopped and the transfer table 42 is stopped. Then, the motor 54 is driven, rotating the worm 55, which in turn rotates the worm wheel 56. Thereupon, the pin 57 provided at an eccentric position on the worm wheel 56 moves along a circle. The other end of the L-shaped lever 58, in one end of which the pin 57 is fitted, therefore moves rearward. Then, the biasing force of the spring 60 closes the pickers 50 and 51. The pawls 50a and 51a therefore go into the recesses cut in the side of the tape cassette that is held in the case 12. The pickers 50 and 51 clamp the tape cassette.

While the tape cassette remains clamped, the components move in reverse direction. Thus, the transfer table 42 is moved backward. The user can therefore remove the tape cassette from the case 12.

[c] Transportation of the Tape Cassette to the Drive

The lift table 25 is moved downward, by two steps, to the position shown in FIG. 10. The slide table 33 is then moved to the right (or to the left as viewed from the front). So moved, the slide table 33 comes to oppose the target drive 8. The transfer table 42 is thereby moved forward. Then, the tape cassette 67 clamped is inserted into the drive 8. Thereafter, the motor 54 is driven in the reverse direction, whereby the pair of pickers 50 and 51 are opened against the biasing force of the spring 60. The tape cassette 67 is therefore released from the pickers 50 and 51 and inserted into the drive 8. Thereafter, the transfer table 42 is moved back and stops transporting the tape cassette 67 into the drive 8.

[d] Returning of Cassette from the Drive to the Cassette Shelf

When the apparatus finishes recording or reproducing data on or from the magnetic tape in the tape cassette, the tape cassette is returned from the drive 8 and inserted back into the case 12 of the cassette shelf 9. The related components move in the direction reverse to those directions in which they are moved to remove the tape cassette from the case 12 and insert the same into the drive 8.

In the embodiment described above, two or four cases are laid, one upon another on the cassette shelf 9. Nonetheless, three or five cases may be laid, one upon another. Further, each expansion unit may not have a cassette shelf, but has drives 8 only. Moreover, the units may be arranged side by side, or in a horizontal direction. Further, all units need not have an inlet opening; only the basic unit may have an inlet opening.

What is claimed is:

1. A recording/playback apparatus comprising:
   a housing;
   a storage mechanism having a rotary member and a plurality of storage sections and arranged in a front of the housing for storing a plurality of recording mediums, said rotary member rotating around a vertical axis in a horizontal plane, and said storage sections being arranged around the rotary member for storing at least one recording medium;

an insertion port positioned in a front panel of the housing for allowing a recording medium to be inserted and removed into and from any one of the plurality of storage sections located at the front of the housing;

a recording/playback section for recording and reproducing data on and from the recording medium;

a transport mechanism arranged at a back of the storage mechanism for transporting the recording medium between the recording/playback section and any one of the plurality of storage sections located at the front of the housing;

a control circuit section connected to the storage mechanism, the recording/playback section, and the transport mechanism for controlling the storage mechanism, the recording/playback section, and the transport mechanism; and transmitting/receiving means for transmitting and receiving data signals to and from memory means provided in any one of the plurality of recording mediums and that stores management data, without contacting the memory means and by using an antenna, and for transmitting the data obtained from the recording medium to the control circuit section, wherein the antenna is located near the storage mechanism at a position so as to transmit and receive data signals to and from the memory means before the recording medium inserted into one storage section of the storage mechanism through the insertion port is completely transported to the transport mechanism as the rotary member of the storage mechanism is rotated.

2. The recording/playback apparatus according to claim 1, wherein the transport mechanism comprises optical reading means for optically reading codes provided on the recording medium and representing the management data and for transmitting data obtained thereby to the control circuit section.

3. The recording/playback apparatus according to claim 2, wherein the control circuit section performs a process to use at least a part of the data transmitted from the transmitting/receiving means, as data supplied from the optical reading means, when the transmitting/receiving means transmits the data obtained from the memory means of the recording medium and the optical reading means transmits no data at all.

4. The recording/playback apparatus according to claim 1, wherein the recording medium is a tape cassette containing a magnetic tape.

5. A data library comprising:

a housing;

a storage mechanism having a rotary member and a plurality of storage sections and arranged in a front of the housing for storing a plurality of tape cassettes, said rotary member rotating around a vertical axis in a horizontal plane, and said storage sections being arranged around the rotary member for storing the tape cassettes;

an insertion port positioned in a front panel of the housing for allowing a tape cassette to be inserted and removed into and from any one of the plurality of storage sections located at the front of the housing;

a recording/playback section for recording and reproducing data on and from the tape cassette;

a transport mechanism arranged at a back of the storage mechanism for transporting the tape cassettes between the recording/playback section and any one of the plurality of storage sections located at the front of the housing;

a control circuit section connected to the storage mechanism, the recording/playback section, and the transport mechanism for controlling the storage mechanism, the recording/playback section, and the transport mechanism; and transmitting/receiving means for transmitting and receiving data signals to and from memory means provided in any one of the plurality of tape cassettes and that stores management data, without contacting the memory means and by way of an antenna, and for transmitting the data obtained from the tape cassette to the control circuit section, wherein the antenna is located near the storage mechanism at a position so as to transmit and receive data signals to and from the memory means before the tape cassette inserted into one storage section of the storage mechanism through the insertion port is completely transported to the transport mechanism as the rotary member of the storage mechanism is rotated.

6. The data library according to claim 5, wherein the transport mechanism comprises optical reading means for optically reading codes provided on the tape cassette and representing the management data and for transmitting data obtained thereby to the control circuit section.

7. The data library according to claim 6, wherein the control circuit section performs a process to use at least a part of the data transmitted from the transmitting/receiving means, as data supplied from the optical reading means, when the transmitting/receiving means transmits the data obtained from the memory means of the tape cassette and the optical reading means transmits no data at all.

8. The data library according to claim 5, wherein each of the plurality of tape cassettes incorporates a magnetic tape that has an 8 mm width.

* * * * *